(12) United States Patent
Grois et al.

(10) Patent No.: US 12,244,871 B2
(45) Date of Patent: Mar. 4, 2025

(54) SYSTEMS, METHODS, AND APPARATUSES FOR PROCESSING VIDEO

(71) Applicant: Comcast Cable Communications, LLC, Philadelphia, PA (US)

(72) Inventors: Dan Grois, Beer-Sheva (IL); Alexander Giladi, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 134 days.

(21) Appl. No.: 17/171,512

(22) Filed: Feb. 9, 2021

(65) Prior Publication Data
US 2022/0007062 A1    Jan. 6, 2022

Related U.S. Application Data

(63) Continuation of application No. 16/354,492, filed on Mar. 15, 2019, now Pat. No. 10,931,977, which is a
(Continued)

(51) Int. Cl.
| | |
|---|---|
| *G06K 9/36* | (2006.01) |
| *H04N 19/117* | (2014.01) |
| *H04N 19/14* | (2014.01) |
| *H04N 19/162* | (2014.01) |
| *H04N 19/169* | (2014.01) |
| *H04N 19/172* | (2014.01) |

(Continued)

(52) U.S. Cl.
CPC ........... *H04N 19/98* (2014.11); *H04N 19/117* (2014.11); *H04N 19/14* (2014.11); *H04N 19/162* (2014.11); *H04N 19/172* (2014.11); *H04N 19/186* (2014.11); *H04N 19/1883* (2014.11); *H04N 19/33* (2014.11); *H04N 19/46* (2014.11); *H04N 19/86* (2014.11); *H04N 19/96* (2014.11)

(58) Field of Classification Search
CPC ...... H04N 19/98; H04N 19/117; H04N 19/14; H04N 19/162; H04N 19/172; H04N 19/186; H04N 19/1883; H04N 19/33; H04N 19/46; H04N 19/86; H04N 19/96
See application file for complete search history.

(56) References Cited

U.S. PATENT DOCUMENTS

| | | |
|---|---|---|
| 5,450,216 A | 9/1995 | Kasson |
| 6,360,022 B1 | 3/2002 | Lubin et al. |

(Continued)

OTHER PUBLICATIONS

Asano, et al, Image Quality Evaluation Based on Human Visual Perception, IEEE, 2068-2073, 2011.
(Continued)

*Primary Examiner* — Howard D Brown, Jr.
(74) *Attorney, Agent, or Firm* — BakerHostetler

(57) ABSTRACT

Systems, methods, and apparatuses are described for processing video. Video content comprising a plurality of frames may be received. A visual element of a first frame of the plurality of frames positioned in an oblique direction relative to one or more of a first axis and a second axis orthogonal to the first axis may be determined. One or more regions associated with the first frame and comprising the visual element may be determined. One or more encoded regions of the first frame may be generated based on partitioning the one or more regions comprising the visual element.

39 Claims, 17 Drawing Sheets

Related U.S. Application Data continuation of application No. 16/354,380, filed on Mar. 15, 2019.

(60) Provisional application No. 62/643,682, filed on Mar. 15, 2018.

(51) Int. Cl.

| | | |
|---|---|---|
| *H04N 19/186* | (2014.01) | |
| *H04N 19/33* | (2014.01) | |
| *H04N 19/46* | (2014.01) | |
| *H04N 19/86* | (2014.01) | |
| *H04N 19/96* | (2014.01) | |
| *H04N 19/98* | (2014.01) | |

(56) References Cited

U.S. PATENT DOCUMENTS

| | | | |
|---|---|---|---|
| 2006/0098881 A1* | 5/2006 | Kim | H04N 19/12 |
| | | | 375/E7.145 |
| 2007/0116361 A1 | 5/2007 | Le et al. | |
| 2009/0027558 A1 | 1/2009 | Mantiuk et al. | |
| 2009/0285478 A1 | 11/2009 | Thiebaud et al. | |
| 2013/0195204 A1 | 8/2013 | Reznik et al. | |
| 2014/0363093 A1 | 12/2014 | Miller et al. | |
| 2015/0029210 A1 | 1/2015 | Daly et al. | |
| 2015/0078661 A1 | 3/2015 | Granados et al. | |
| 2015/0304685 A1 | 10/2015 | Vanam et al. | |
| 2015/0312595 A1 | 10/2015 | Vanam et al. | |
| 2016/0219248 A1 | 7/2016 | Reznik et al. | |
| 2018/0020215 A1 | 1/2018 | Ramamurthy et al. | |
| 2018/0261184 A1 | 9/2018 | Ninan | |
| 2019/0068969 A1 | 2/2019 | Rusanovskyy et al. | |

OTHER PUBLICATIONS

Nadenau M J et al: "Wavelet-based color 1-15 image compression: exploiting the contrast sensitivity function", IEEE Transactions on Image Processing, IEEE Service Center, Piscataway, NJ, US, vol. 12, No. 1, Jan. 1, 2003, pp. 58-70.

US Patent Application filed Mar. 15, 2019, entitled "Systems, Methods, and Apparatuses for Processing Video", U.S. Appl. No. 16/354,492.

Fernandez-Maloigne et al., "Spatio temporal characteristics of the human color perception for digital quality assessment", International Symposium on Signals, Circuits and Systems, 2005. ISSCS 2005, pp. 203-206.

Kerofsky et al., "Improved Adaptive Video Delivery System Using a Perceptual Pre-processing Filter" GlobalSIP 2014: Perception Inspired Multimedia Signal Processing Techniques, Date of Conference, Dec. 3-5, 2014, pp. 1-5.

Sini Simon et al., "Performance improvement in SHVC using contrast sensitivity function", 2016 IEEE Region 10 Conference (TENCON); Date of Conference: Nov. 22-25, 2016, pp. 807-811.

\* cited by examiner

SYSTEMS, METHODS, AND APPARATUSES FOR PROCESSING VIDEO

CROSS-REFERENCE TO RELATED APPLICATIONS

This application is a continuation application of U.S. application Ser. No. 16/354,492, filed Mar. 15, 2019, which is a continuation application of U.S. application Ser. No. 16/354,380, filed Mar. 15, 2019, which claims priority to U.S. Provisional Application No. 62/643,682, filed Mar. 15, 2018, each of which is entitled "Systems, Methods, And Apparatuses For Processing Video," and is hereby incorporated by reference in its entirety.

BACKGROUND

Video and/or images often present highly bright as well as very dark signals on the same video frame or image, thereby providing a high contrast ratio within the same image. However, coding (e.g., compression) the video or image content remains challenging due to user demand for high visual quality, which in turn requires allocating more bits and significantly increasing video or image coding depth to achieve the desired user quality. In addition, the transmission bandwidth is limited due to typical limitations of the existing network infrastructures, especially when transmitting over wireless/cellular networks. As such, improvements are needed.

SUMMARY

Systems, methods, and apparatuses are described for processing video. Processing may comprise preprocessing, wherein video content may be received at a video preprocessor from a video source. The video source may be video storage, such as from a video-on-demand database. The video source may be a video stream, such as a live feed from a camera. The video preprocessor may output preprocessed video that may be transmitted (e.g., sent, delivered, etc.) as input to a video encoder. The video content may comprise a plurality of frames.

Processing may comprise determining a visual element of a first frame of the plurality of frames positioned in an oblique direction relative to one or more of a first axis and a second axis orthogonal to the first axis. One or more regions associated with the first frame and comprising the visual element may be determined. One or more encoded regions of the first frame may be generated based on partitioning the one or more regions comprising the visual element. Processing may comprise post-encoding processing. Post-encoding processing may comprise modifying already encoded video data. These and other video processing systems, methods, and apparatuses are described herein.

BRIEF DESCRIPTION OF THE DRAWINGS

The following drawings show generally, by way of example, but not by way of limitation, various examples discussed in the present disclosure. In the drawings.

DETAILED DESCRIPTION

Video (e.g., High Dynamic Range (HDR) video and other types of video) often comprises relatively high luminance levels and fine shadow details, which extend far beyond more conventional types of video, such as Standard Dynamic Range (SDR) video. Video, including the noted HDR video, may comprise highly bright as well as very dark signals for the same video frame, thereby providing a high contrast ratio within the same image. For example, HDR video has gained popularity with the finalization of the High Efficiency Video Coding (HEVC) standard, which allows compressing high-resolution HDR content, such as 3840×2160 (4K) resolutions in terms of luma samples, in a more efficient manner compared to its predecessor H.264/MPEG-AVC.

In some cases, video content may be unintentionally compressed with visually perceived coding artifacts. For example, bandwidth limitations (e.g., 6 Megabits (Mb) to 14 Mb per second) may likewise limit compression techniques applied to video content. Moreover, encoding video, such as HDR video, normally consumes significant computational resources due to a demand to preserve fine details within the video. Therefore, there is a need to improve the perceived visual quality of the compressed video without increasing its bit-rate.

Figure 1:
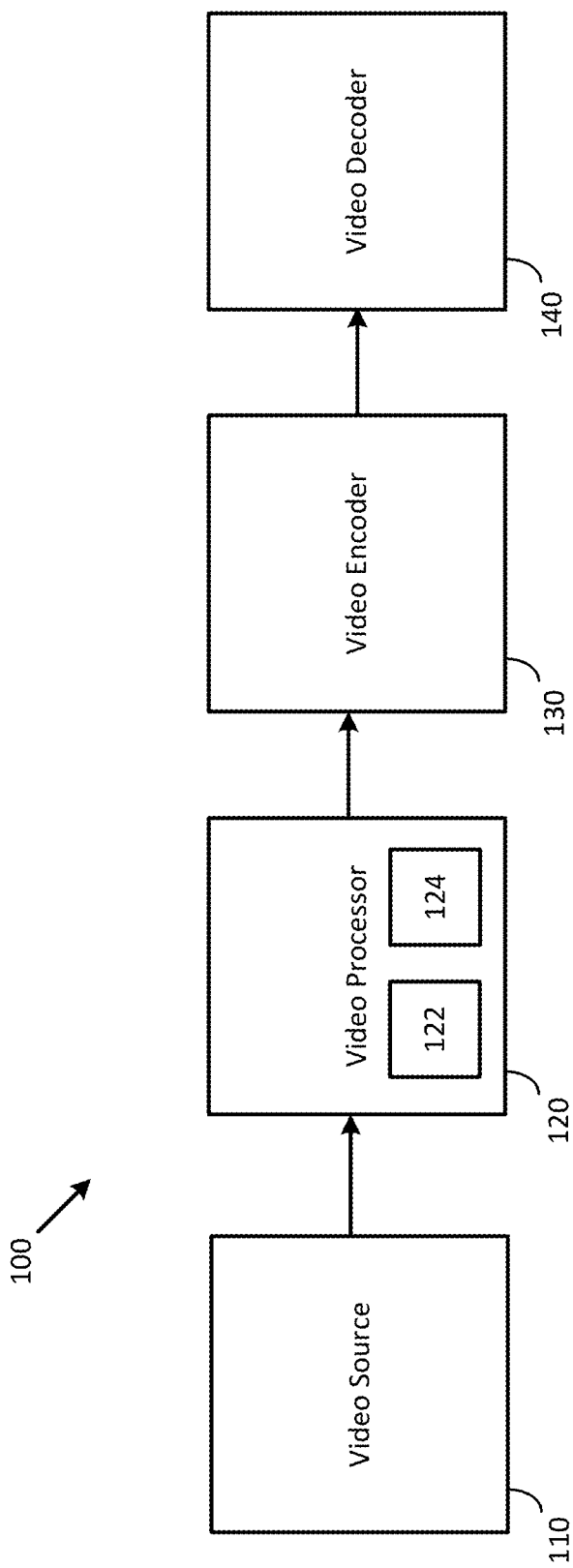
FIG. 1 is a block diagram of a video distribution system.

FIG. 1 shows a block diagram of a video distribution system 100. The video distribution system 100 may comprise a video source 110, a video preprocessor 120, a video encoder 130, and a video decoder 140. The video source 110 may provide (e.g., send, transmit, or deliver) video (e.g., audio and/or visual) content. For example, the video source 110 may be provided (e.g., sent, transmitted, or delivered) based on (e.g., in response to) a request. The request may be from a user device, such as a mobile device, a set-top box, a cable modem, etc. The request may be based on a schedule (such as a network's programming schedule, for example), which automatically requests video content related to a particular program at a particular time. Video content may comprise a plurality of frames, a single frame among a plurality of frames, or a single independent (e.g., not part of an plurality of video frames (ordered or otherwise)) frame. Video content may optionally comprise associated audio content. The video source 110 may be video storage, such as from a video-on-demand database. The video source 110 may be a video stream, such as a live feed from a camera. The video content provided from the video source 110 may be raw (e.g., uncompressed, unprocessed, not encoded, etc.) video.

The video preprocessor 120 may receive (e.g., intercept, etc.) video from the video source 110. The video preprocessor 120 may comprise one or more logical blocks of instructions 122, 124 for preprocessing video. The video source 110 and the video preprocessor 120 may be integrated into one or more computing devices. The video source 110 and the video preprocessor 120 may be local to one another (e.g., in the same room, on the same premises, etc.). The video source 110 and the video preprocessor 120 may be remote from one another. The video preprocessor 120 may execute one or more of the one or more logical blocks of instructions 122, 124 to convert received raw video into preprocessed (e.g., coded, etc.) video.

The video preprocessor 120 may transmit (e.g., send, deliver, etc.) the preprocessed video to a video encoder 130. The video encoder 130 may treat the received preprocessed video as input. The video encoder 130 may encode the preprocessed video, such as to generate or determine encoded (e.g., compressed, etc.) video data. Encoding preprocessed video may be more efficient in some instances than encoding raw video received directly from the video source 110. The video encoder 130 may send the video data to a device requesting the video content. The video preprocessor 120 and the video encoder 130 may be integrated into one or more computing devices. The video preprocessor 120 and the video encoder 130 may be local to one another (e.g., in the same room, on the same premises, etc.). The video preprocessor 120 and the video encoder 130 may be remote from one another.

The video encoder 130 may transmit (e.g., send, deliver, etc.) the encoded video data to the video decoder 140. The video decoder 140 may be remote from the video encoder 130. The video decoder 140 may be realized by or as part of a user device. The video decoder 140 may receive the encoded video data from the video encoder 130. The video decoder 140 may decode the received encoded video data. The video decoder 140 may output the decoded video data. The output decoded video data may be presented (e.g., caused to be output) to a viewer, such as via the user device and/or a display associated with the user device.

The video distribution system 100 may comprise a video delivery system, such as a Video-On-Demand (VOD) system. The video delivery system may comprise a server (e.g., a VOD server), which may be or may comprise the video source 110. The server may receive a request for video content from a set-top box. The video delivery system may comprise a preprocessing unit to receive raw video from the server. The server may transmit (e.g., send, deliver, etc.) raw video related to the received request to the preprocessing unit. The preprocessing unit may be or may comprise a video preprocessor 120. The preprocessing unit may comprise one or more logical blocks of instructions 122, 124 to preprocess received video for easier encoding (e.g., more efficient, faster, etc.) at a video encoder 130. The preprocessing unit may transmit the preprocessed video to a video encoder 130. The video encoder 130 may encode the preprocessed video and transmit the encoded video to the set-top box.

An achromatic and/or chromatic Contrast Sensitivity Function (CSF) or CSF model may be used for processing video (e.g., pre-processing video). The CSF or CSF model may be adaptively optimized. The adaptively optimized CSF or CSF model may be applied to one or more frames of video data, such as HDR video.

Contrast sensitivity may refer to an individual's ability to visually differentiate between—or a sensitivity to—two or more visual aspects in a video or image. Those visual aspects may relate to luminance (perceived "brightness"), as may be the case when a video or image comprises contiguous areas having varying degrees of luminance (e.g., black and white areas). Contrast sensitivity to varying degree of luminance may be referred to as achromatic contrast sensitivity. Contrast sensitivity relating to chrominance (i.e., perceived "color") may be referred to as chromatic contrast sensitivity. Chromatic contrast sensitivity may indicate an ability to differentiate between contiguous areas having varying chrominance characteristics, such as contiguous areas having two different colors, a color and white, or a color and black.

Due to limitations of the human eye and visual system, contrast sensitivity to luminance may be significantly greater than contrast sensitivity to chrominance. For example, visual information in an image is more significantly carried in the luminance aspects rather than the chrominance aspects. Taking an extreme example, video content displayed on a black-and-white television set is stripped of all chrominance aspects, yet may be readily perceived and understood by a viewer. In the converse case, however, video content displayed with only chrominance components and no luminance would be largely indecipherable to a viewer.

Contrast sensitivity may be individual-specific, although the Human Visual System (HVS) model may provide a standard measure for contrast sensitivity, as well as other attributes or functions relating to visual perception. Reference to contrast sensitivity and other associated concepts may be made with respect to the HVS, unless indicated otherwise.

Further relating to chrominance, a chromatic contrast sensitivity may separately describe a sensitivity to one or more components of color in a color space or system. For example, in a YUV-type color space, Y represents luminance, U represents a first color component, and V represents a second color component. YCbCr is one type of YUV color space, with Y again representing a luminance component, Cb representing a blue-difference chroma component (e.g., blue minus Y), and Cr representing a red-difference chroma component (e.g., red minus Y). The YCbCr color space is commonly associated with digital video, as opposed to its YPbPr analog counterpart. Another color space may be ICtCp, with I indicating a luma component, and for example, Ct indicating a blue-yellow chroma component, and Cp indicating a red-green chroma component. A chromatic contrast sensitivity may separately indicate a sensitivity to a particular one of the U (e.g., Cb) or the V (e.g., Cr) color components. An example chromatic contrast sensitivity may indicate a sensitivity to a combination of the U and the V color components. A chromatic contrast sensitivity may apply to any color space and/or any combination of color spaces.

A CSF may represent a relationship between contrast sensitivity and a spatial frequency of an associated visual stimuli. For example, a CSF may indicate the contrast thresholds at which variations in luminance and/or chrominance, along a continuum of spatial frequencies, can no longer be resolved. An example visual stimuli associated with contrast sensitivity (e.g., achromatic contrast sensitivity) may comprise a series of alternating black and white bars arranged as a sine-wave grating. The widths of the black and white bars progressively decrease (i.e., their spatial frequency increases) and the contrast between neighboring black and white bars likewise decreases progressively along the bars' lengths. A similar sine-wave grating may be configured with bars of alternating colors rather than black and white. The alternating colors presented in a sine-wave grating may each be colors presented without a luminance component ("chromaticity"). A sine-wave grating comprising alternating colors may be associated with a chromatic contrast sensitivity and thus also a chromatic CSF. It is already noted that a black and white sine-wave grating may be associated with an achromatic contrast sensitivity. Thus a black and white sine-wave grating may be additionally associated with an achromatic CSF.

Figure 2:
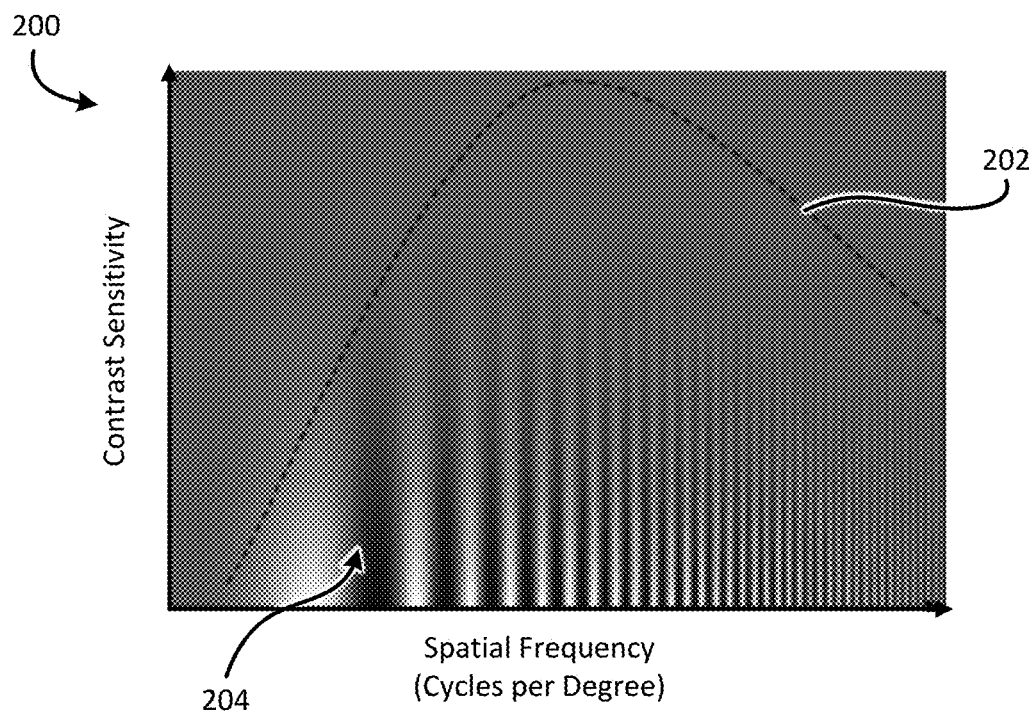
FIG. 2 is a graphical representation of values used by a filter.

FIG. 2 shows a graph 200 with a vertical axis indicating a contrast sensitivity measurement and a horizontal axis indicating an increasing spatial frequency (e.g., cycles per degree). The graph 200 comprises a sine-wave grating 204 with a series of alternating black and white bars. The progressive increase of spatial frequency towards the right in the graph 200 is visually reflected in the corresponding decrease in the width of each bar, which also has the effect of decreasing the distance between successive bars of the same type (e.g., from black bar to black bar or from white bar to white bar). It will also be observed that the contrast between neighboring black and white bars is greatest at the bottom of the graph 200 proximate the horizontal axis and progressively decreases as the bars extend vertically upward from the horizontal axis. In this respect, the vertical axis further maps a progressively decreasing contrast.

A CSF 202 is shown on the graph 200. The CSF may indicate a contrast threshold at which a person (e.g., according to the HVS model) is no longer able to perceive variations in contrast over a continuum of one or more spatial frequencies. Here, the (achromatic) CSF 202 indicates the contrast threshold at which a person becomes unable to perceive the transitions between the black and white bars over the continuum of spatial frequencies indicated by the horizontal axis. Thus, a person would be unable to perceive the transitions between the white and black bars under the contrast and spatial frequency conditions represented by the area(s) of the graph 200 that are above the CSF 202. Conversely, a person would be able to perceive the transitions between the black and white bars under the conditions represented by the area(s) below the CSF 202. The perceptibility of the black and white bars indicated by the CSF 202 is borne out by the visual representation of the black and white sine-wave grating 204. While the graph 200 and CSF 202 relate to achromatic contrast sensitivity, these concepts may be equally applicable to chromatic contrast sensitivity.

By customizing the CSF applied on each video frame (or at least a portion or grouping of a video frame), a significant reduction of an overall video bit-rate may be achieved with substantially no degradation in the perceived visual quality. A CSF curve of video content (e.g., HDR video content) may be customized such that relatively high spatial frequencies, which are typically not detectable/visible by the HVS, are removed. An encoder may allocate more bits to more important and/or noticeable regions within each video frame and fewer bits to high spatial frequencies regions, which may be less important and/or less noticeable regions, instead of allocating equal bits to all regions of each video frame. This may enable more efficient encoding (e.g., compression).

Figure 3:
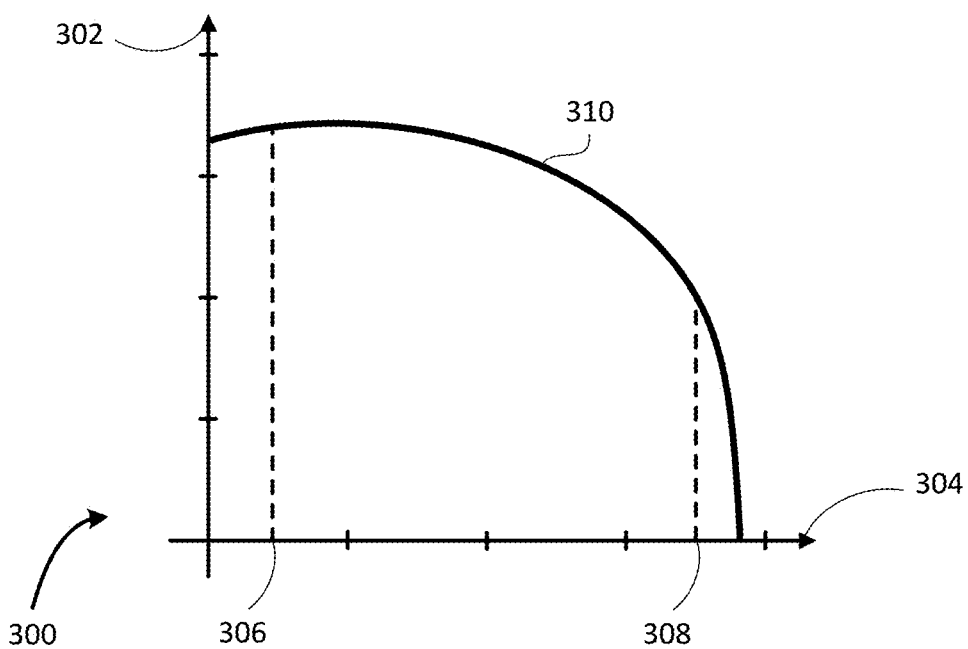
FIG. 3 is a graphical representation of values used by a filter.

FIG. 3 shows a graphical representation 300 of example values used by an example filter. The graphical representation 300 of example values used by an example filter comprises a vertical axis 302. The vertical axis 302 may comprise values related to contrast sensitivity. The graphical representation 300 of example values used by an example filter may comprise a horizontal axis 304. The horizontal axis 304 may comprise values related to spatial frequency (i.e., sinusoidal grating cycles per degree of viewing angle). The horizontal axis 304 may comprise a minimum cutoff value 306 ($f_{min}$). The minimum cutoff value 306 may be the lower spatial visual frequency limit that may be distinguished by the HVS. The horizontal axis 304 may comprise a maximum cutoff value 308 ($f_{max}$). The maximum cutoff value 308 may be the upper spatial visual frequency limit that may be distinguished by the HVS. The graphical representation 300 of example values used by an example filter may comprise a CSF curve 310. Value sets under the CSF curve 310, to the right of the minimum cutoff value 306, and to the left of the maximum cutoff value 308 may be in a window of visibility. Values outside the window of visibility may be removed from a frame prior to encoding, allowing an encoder to allocate more bits to more noticeable regions of a frame.

As an example, a maximal visible spatial frequency for viewing angles α varying from 0° to 120° (e.g., 20°, 40°), may be defined as follows:

$f_{high}(\alpha) = \max(CSF(f, \alpha))$ for $0 \le \alpha \le 120°$

A highest visible spatial frequency $f_{high}(con_{mn})$ may be defined per each pixel within every video frame as follows:

$$f_{high}(con_{mn}) = \begin{cases} f_{min}, & \text{for } f_{int}(con_{mn}) < f_{min} \\ f_{int}(con_{mn}), & \text{for } f_{min} \le f_{int}(con_{mn}) \le f_{max} \\ f_{max}, & \text{for } f_{max} < f_{int}(con_{mn}) \end{cases}$$

where $con_{mn}$ is the corresponding contrast sensitivity of each pixel at location [m, n]; $f_{min}$ is the lower (minimal) visual spatial frequency (i.e. lower cut-off frequency), which may still be distinguished by the HVS (i.e., a peak of the CSF curve); $f_{max}$ is the upper (maximal) spatial visual frequency limit (i.e. upper cut-off frequency) of the HVS (i.e. the HVS visual acuity limit); and $f_{int}$ is the intermediate spatial frequency which is bounded by $f_{min}$ and $f_{max}$.

The CSF curve may influence (e.g., define, provide the values for, etc.) a band-pass filter, while $f_{max}$ may be determined based on at least one of the following user's viewing parameters:

D—a distance between the user and the display (e.g., HDR display) on which the video content (e.g., HDR video content) is projected (e.g., 2.35 meters);

Ω—a pixel density of the display on which the video content is projected (e.g., 79 pixels per inch (ppi));

L—a pixel length of a sinusoidal grating cycle being observed on the display;

W—a display width in pixels;

α—a viewing angle (e.g., 40°) that is a function of the display width (e.g., 48 inch), display pixel density (e.g., HDR pixel density) as well as a distance between the user and the display;

l—ambient illumination level of the surroundings; and

R—a reflection coefficient of the display.

The distance between the user and the display may be based on user input, a predetermined spot from the display, and/or received data (e.g., positioning data from a mobile device, etc.). Other mechanisms for determining a distance between a user and a display may be used. The ambient illumination level of the surroundings may be based on data received from a light sensor. When considering the distance between the user and the display on which the video content is projected, the CSF cut-off frequency $f_{max}$ may be determined as follows:

$$f_{max} = \left[2 \cdot \arctan\left(\frac{L}{2D\Omega}\right) \cdot 180°/\pi\right]^{-1},$$

while the relationship between the viewing angle and the viewing distance may be defined by the following equation:

$$\alpha = 2 \cdot \arctan\left(\frac{W}{2D\Omega}\right).$$

The $f_{min}$ may be determined by performing a mathematical derivation operation on the CSF curve as a function of the visible spatial frequencies $d(CSF[f_{high}(con_{mn})])$, since the $f_{min}$ may represent a peak of the CSF curve (e.g., a minimal visible spatial frequency, etc.). The $f_{min}$ may be a function of minimal contrast sensitivity of the display, which may be visible by the user. The $f_{min}$ may be set to a minimal frequency value out of the above two constraints.

The customized CSF or model may consider one or more of luminance (luma) and each of two chrominance (chroma) components of the video content in a separate manner. The CSF for luma (i.e., achromatic CSF) may differ from the CSF for chroma (i.e., chromatic CSF), allowing better representation of the HVS in which the sensitivity of the luma sensors (i.e., rods) differs from the sensitivity of the color sensors (i.e., cones). A highest visible spatial frequency $f_{high}(con_{mn})$ may be defined for luma and chroma components in a different manner, giving a rise to $f_{high}^{luma}(con_{mn})$ and $f_{high}^{chroma}(con_{m,n})$ as follows:

$$f_{high}^{luma}(con_{mn}) = \begin{cases} f_{min}^{luma}, & \text{for } f_{int}(con_{mn}) < f_{min}^{luma} \\ f_{int}(con_{mn}), & \text{for } f_{min}^{luma} \leq f_{int}(con_{mn}) \leq f_{max}^{luma} \\ f_{max}^{luma}, & \text{for } f_{max}^{luma} < f_{int}(con_{mn}) \end{cases}$$

and $$f_{high}^{chroma}(con_{mn}) = \begin{cases} f_{min}^{chroma}, & \text{for } f_{int}(con_{mn}) < f_{min}^{chroma} \\ f_{int}(con_{mn}), & \text{for } f_{min}^{chroma} \leq f_{int}(con_{mn}) \leq f_{max}^{chroma} \\ f_{max}^{chroma}, & \text{for } f_{max}^{chroma} < f_{int}(con_{mn}) \end{cases}$$

Figure 4:
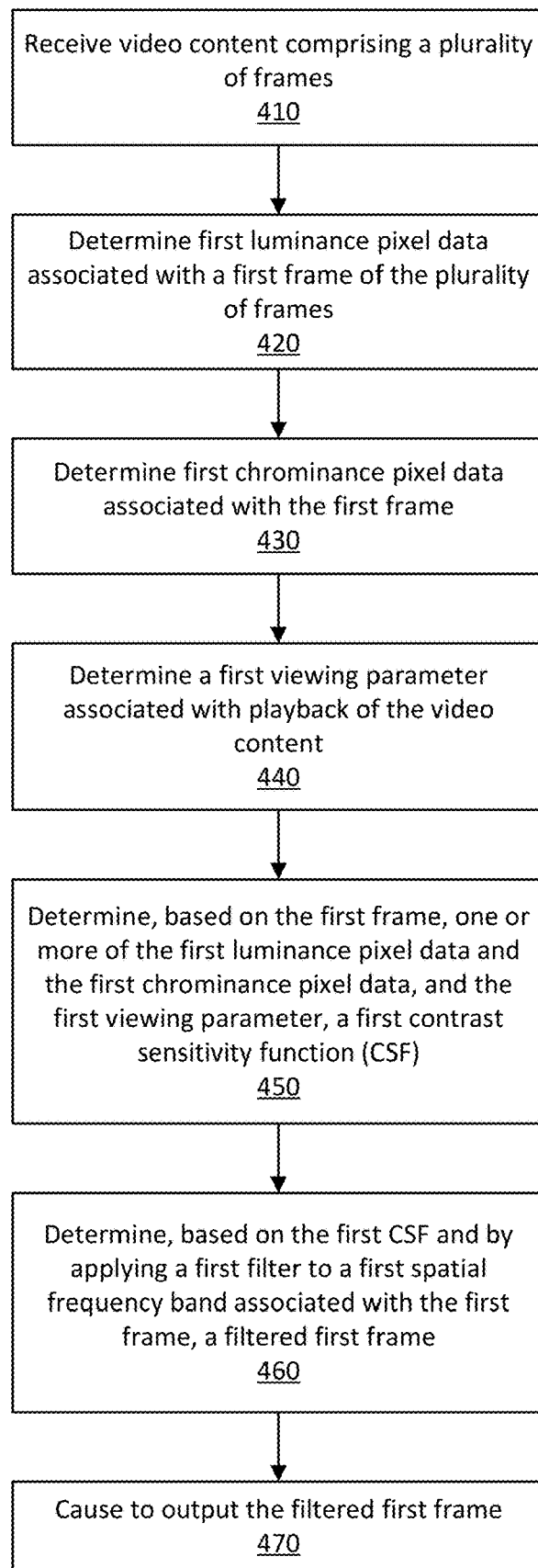
FIG. 4 is a flow diagram of a method.

FIG. 4 shows a flow diagram of a method. Video content may be received at step 410. For example, uncompressed video content may be received at a video preprocessor, such as video preprocessor 120 in FIG. 1, from a video source, such as video source 110 in FIG. 1. The video content may comprise a plurality of frames. The video content may be transmitted to the video preprocessor from the video source based on a request for the video content received at the video source. The video content may comprise uncompressed (e.g., raw, unprocessed, etc.) video content. The video content may comprise High Dynamic Range (HDR) video content. The video content may comprise HDR uncompressed video content.

One or more of luminance data and chrominance data associated with one or more of the plurality of frames may be determined. Where chrominance data is determined, such chrominance data may comprise information in one or more of the U channel and the V channel. At step 420, first luminance pixel data may be determined. For example, a video preprocessor, such as video preprocessor 120 in FIG. 1, may determine first luminance pixel data. The first luminance pixel data may be associated with a first frame of the plurality of frames. At step 430, first chrominance pixel data may be determined. For example, a video preprocessor, such as video preprocessor 120 in FIG. 1, may determine first chrominance pixel data. The first chrominance pixel data may be associated with the first frame.

At step 440, a first viewing parameter may be determined. For example, a video preprocessor, such as video preprocessor 120 in FIG. 1, may determine a first viewing parameter. The first viewing parameter may be associated with playback of the video content. The first viewing parameter may comprise one or more of a viewing distance, a pixel density, a pixel length of a sinusoidal grating cycle, a width of a display associated with playback of the video content, a viewing angle, ambient illumination level, and a reflection coefficient of a display associated with playback of the video content. The viewing distance may be based on a predetermined value, a value received from a user device (e.g., a value entered by a user, a value derived from positioning information, etc.), a value received from one or more sensors, etc. Information associated with the type of device being used for viewing may be determined via sensors or through other data collection mechanisms. As such, the first viewing parameter may be dependent on characteristics of a type of device being used.

At step 450, a first contrast sensitivity function (CSF) or model may be determined (e.g., generated). For example, a video preprocessor, such as video preprocessor 120 in FIG. 1, may generate a first CSF. The first CSF may be based, at least in part, on the first frame. The first CSF may be based, at least in part, on the first luminance pixel data. Additionally or alternatively, the first CSF may be based, at least in part, on the first chrominance pixel data. The first CSF may be based on the first frame, the one or more of the first luminance pixel data and the first chrominance pixel data, and the first viewing parameter. Where the chrominance pixel data is used, the first CSF may be based on one or more of the U channel and the V channel. The first CSF may be based, at least in part, on the first viewing parameter. The first CSF may comprise an achromatic function. The first CSF may comprise a chromatic function. The first CSF may comprise both an achromatic function and a chromatic function. The CSF may be determined in accordance with one or more of the following: Barten (Ramp) threshold, Schreiber threshold.

At step 460, a first filtered frame may be determined. A video preprocessor, such as the video preprocessor in FIG. 1, may determine the first filtered frame. Determining the first filtered frame may comprise processing the first frame. The first filtered frame may be determined based on the first CSF. The first filtered frame may be additionally or alternatively determined based on a first filter. The first filtered frame may be additionally or alternatively determined by applying the first filter to a first spatial frequency band associated with the first frame. The first filter may be represented by the graphical representation 300 described in reference to FIG. 3 above. The first spatial frequency band may comprise a first frequency maximum. The first spatial frequency band may comprise a first frequency minimum. The first spatial frequency band may comprise a first bandwidth.

At step 470, the filtered first frame may be caused to be output. For example, a video preprocessor, such as video preprocessor 120 in FIG. 1, may output the filtered first frame to a video encoder, such as video encoder 130 in FIG. 1. The outputting the filtered first frame may comprise compressing the filtered first frame. The video encoder may compress the filtered first frame. The outputting the filtered first frame may comprise transmitting the compressed filtered first frame for playback. The video encoder may transmit the compressed filtered first frame for playback on a user device.

Second luminance pixel data associated with a second frame of the plurality of frames may be determined. For example, a video preprocessor, such as video preprocessor 120 in FIG. 1, may determine second luminance pixel data associated with a second frame of the plurality of frames. Second chrominance pixel data associated with the second frame may be determined. For example, a video preprocessor, such as video preprocessor 120 in FIG. 1, may determine second chrominance pixel data associated with the second frame.

Additionally or alternatively, a second viewing parameter may be determined. For example, a video preprocessor, such as video preprocessor 120 in FIG. 1, may determine a second viewing parameter. The second viewing parameter may be associated with viewing playback of the video content. The second viewing parameter may comprise one or more of a viewing distance, a pixel density, a pixel length of a sinusoidal grating cycle, a width of a display associated with playback of the video content, a viewing angle, ambient illumination level, and a reflection coefficient of a display associated with playback of the video content. The viewing distance may be based on a predetermined value, a value received from a user device (e.g., a value entered by a user, a value derived from positioning information, etc.), a value received from one or more sensors, etc. Information associated with the type of device being used for viewing may be determined via sensors or through other data collection mechanisms. As such, the first viewing parameter may be dependent on characteristics of a type of device being used. It is understood that the second viewing parameter may be the same as the first viewing parameter (e.g., the viewing conditions have not changed) or the viewing parameters may be different.

A second contrast sensitivity function (CSF) or model may be determined (e.g., generated). For example, a video preprocessor, such as video preprocessor 120 in FIG. 1, may determine a second CSF. The second CSF may be based, at least in part, on the video content. The second CSF may be based, at least in part, on the second luminance pixel data. Additionally or alternatively, the second CSF may be based, at least in part, on the second chrominance pixel data. Where the chrominance pixel data is used, the first CSF may be based on one or more of the U channel and the V channel. The second CSF may be based, at least in part, on the second viewing parameter. The second CSF may comprise an achromatic CSF function. The second CSF may comprise a chromatic CSF function.

The second frame may be processed. For example, a video preprocessor, such as video preprocessor 120 in FIG. 1, may process the second frame. Processing the second frame may comprise determining a filtered second frame. Determining the filtered second frame may be based on the second CSF. The filtered second frame may be determined by applying a second filter to a second spatial frequency band associated with the second frame. The second filter may be represented by the graphical representation 300 described in reference to FIG. 3 above. The second spatial frequency band may be different than the first spatial frequency band. The second spatial frequency band may comprise a second frequency maximum. The second spatial frequency band may comprise a second frequency minimum. The second spatial frequency band may comprise a second bandwidth. The first frequency maximum may be different from the second frequency maximum. The first frequency maximum may be the same as the second frequency maximum. The first frequency minimum may be different from the second frequency minimum. The first frequency minimum may be the same as the second frequency minimum. The first bandwidth may be different from the second bandwidth. The first bandwidth may be the same as the second bandwidth.

The filtered second frame may be outputted. For example, a video preprocessor, such as video preprocessor 120 in FIG. 1, may output the filtered second frame to a video encoder, such as video encoder 130 in FIG. 1. The outputting the filtered second frame may comprise compressing the filtered second frame. The video encoder may compress the filtered second frame. The outputting the filtered second frame may comprise transmitting the compressed filtered second frame for playback. The video encoder may transmit the compressed filtered second frame for playback on a user device.

As an example, a user may request video content via a video delivery system (e.g., a Video-On-Demand (VOD) system) via a user device. The request may be received at a server (e.g., a VOD server). The server may provide raw video to a video preprocessor. A portion of a frame of the video content may comprise high spatial frequencies, which may not be perceivable to the user. The high spatial frequencies may be removed from the video content by the video processor and the resulting video content may be provided to a video encoder. With high spatial frequencies removed, the video encoder may allocate bits more efficiently to encode the video content prior to transmitting the encoded video content to the user device.

Figure 5:
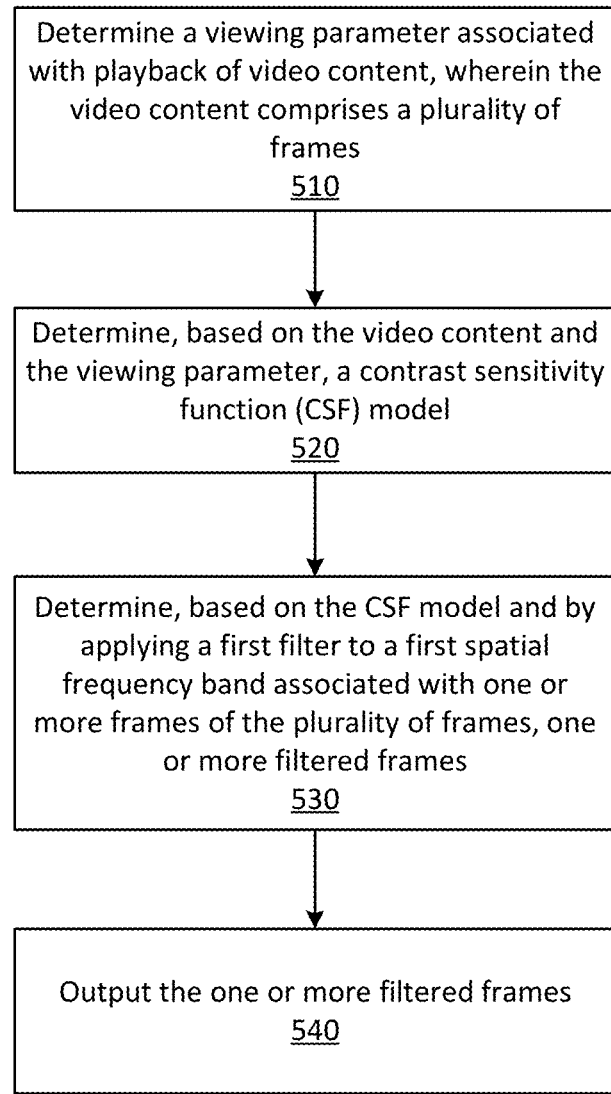
FIG. 5 is a flow diagram of a method.

FIG. 5 shows a flow diagram of a method. A viewing parameter may be determined at step 510. For example, a video preprocessor, such as video preprocessor 120 in FIG. 1, may determine a viewing parameter. The viewing parameter may be associated with playback of video content. The video content may comprise a plurality of frames. The video content may comprise High Dynamic Range (HDR) uncompressed video content. The viewing parameter may comprise one or more of a viewing distance, a pixel density, a pixel length of a sinusoidal grating cycle, a width of a display associated with playback of the video content, a viewing angle, ambient illumination level, and a reflection coefficient of a display associated with playback of the video content.

At step 520, a contrast sensitivity function (CSF) model may be determined (e.g., generated). For example, a video preprocessor, such as video preprocessor 120 in FIG. 1, may generate a CSF model. The CSF model may be determined based on the video content. The CSF model may be determined based on the viewing parameter. The CSF model may comprise an achromatic CSF function. The CSF model may comprise a chromatic CSF function. The CSF model may comprise both an achromatic CSF function and a chromatic CSF function.

At step 530, one or more filtered frames may be determined. The one or more filtered frames may be determined by processing one or more frames of the plurality of frames. For example, a video preprocessor, such as video preprocessor 120 in FIG. 1, may process one or more frames of the plurality of frames. Determining the one or more filtered frames may be based on the CSF model. The one or more filtered frames may be determined by applying a filter to a first spatial frequency band. The first spatial frequency band may be associated with the one or more frames of the plurality of frames. The filter may be represented by the graphical representation 300 described in reference to FIG. 3 above.

At step 540, the one or more filtered frames may be outputted. For example, a video preprocessor, such as video preprocessor 120 in FIG. 1, may cause to output the filtered first frame to a video encoder, such as video encoder 130 in FIG. 1. The outputting the one or more filtered frames may comprise compressing the one or more filtered frames. The video encoder may compress the one or more filtered frames. The outputting the one or more filtered frames may comprise transmitting the compressed one or more filtered frames for playback. The video encoder may transmit the compressed one or more filtered frames for playback on a user device.

Steps 510-540 may be repeated for each frame of the plurality of frames. For example, a video preprocessor, such as video preprocessor 120 in FIG. 1, may repeat steps 510-540 for each frame of the plurality of frames. Steps 510-540 may be repeated for each frame of the plurality of frames such that the CSF model is generated or updated for each frame. Steps 510-540 may be repeated for each frame of the plurality of frames such that each frame is processed based on the CSF model associated with the respective frame.

As an example, the video content may comprise a region of interest comprising a second one or more frames. For each frame of the second one or more frames, a second CSF model may be determined. The second CSF model may be based on the respective frame and the viewing parameter. Additionally or alternatively, for each frame, the filtered respective frame may be caused to be output. Causing to output the filtered respective frame may be based on the second CSF model. The filtered respective frame may be caused to be output based on applying a filter to a second spatial frequency band associated with the second frame. The filtered respective frame may be caused to be output by applying the filter to the second spatial frequency band associated with the second frame. Determining the second CSF model may comprise modifying the first CSF model.

As an example, a user may request video content via a video delivery system (e.g., a Video-On-Demand (VOD) system) via a user device. The request may be received at a server (e.g., a VOD server). The server may provide raw video to a video preprocessor. A portion of a frame of the video content may comprise high spatial frequencies, which may not be perceivable to the user. The high spatial frequencies may be removed from the video content by the video processor and the resulting video content may be provided to a video encoder. With high spatial frequencies removed, the video encoder may allocate bits more efficiently to encode the video content prior to transmitting the encoded video content to the user device.

Figure 6:
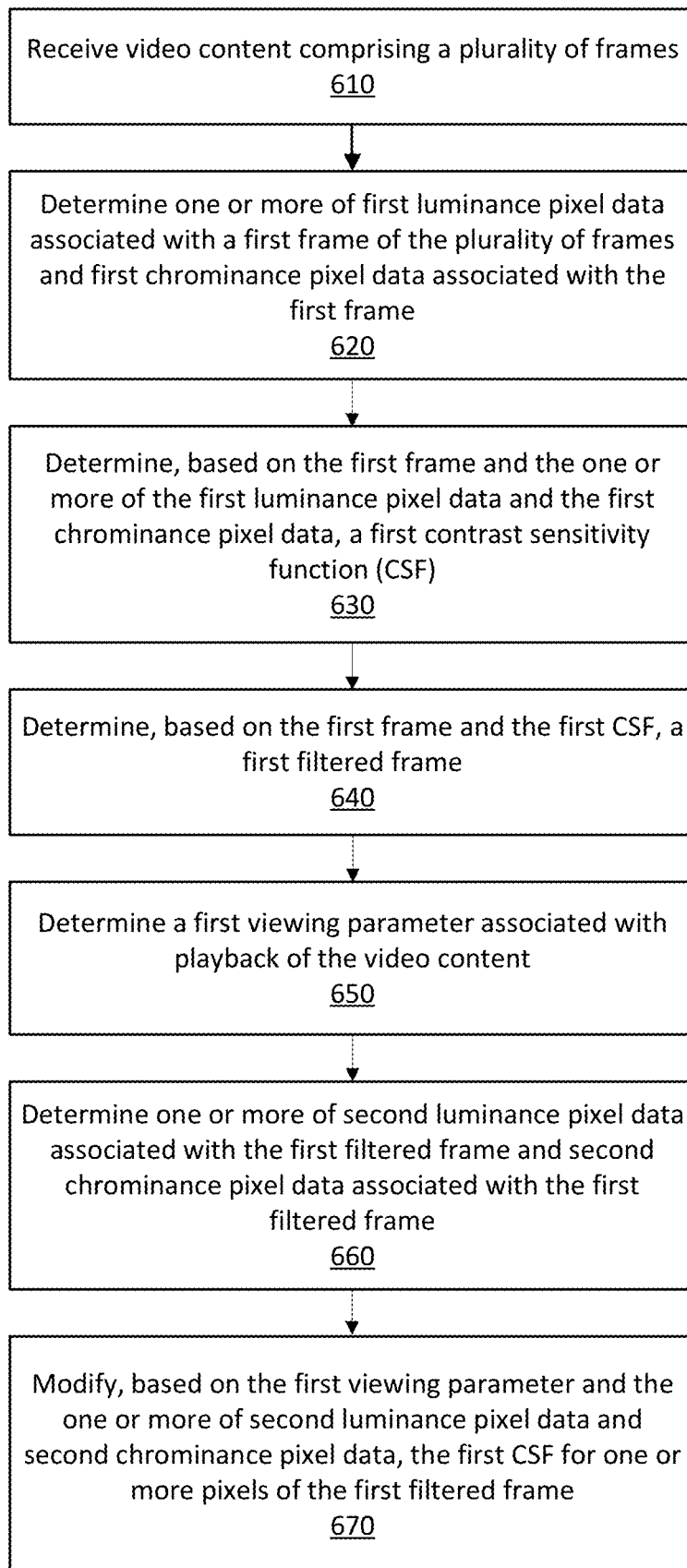
FIG. 6 is a flow diagram of a method.

FIG. 6 shows a method for processing video (e.g., one or more HDR video frames). At step 610, video content may be received. For example, uncompressed video content (e.g., in the Perceptual Quantizer (PQ) 10-bits format) may be received at a video preprocessor, such as video preprocessor 120 in FIG. 1, from a video source, such as video source 110 in FIG. 1. The video content may comprise a plurality of frames. The video content may be transmitted to the video preprocessor from the video source based on (e.g., in response to) a request for the video content received at the video source. The video content may comprise uncompressed (e.g., raw, unprocessed, etc.) video content. The video content may comprise High Dynamic Range (HDR) video content. The video content may comprise HDR uncompressed video content.

At step 620, one or more of first luminance pixel data and first chrominance pixel data may be determined. Where chrominance data is determined, such chrominance data may comprise information in one or more of the U channel and the V channel. A video preprocessor, such as the video preprocessor 120 in FIG. 1, may determine the one or more of first luminance pixel data and first chrominance pixel data. The first luminance pixel data and/or the first chrominance pixel data may be associated with a first frame of the plurality of frames.

At step 630 a first CSF or CSF model may be determined. The first CSF may be determined based at least in part on the first frame and one or more of the first luminance pixel data and the first chrominance pixel data. The first CSF may be determined by a preprocessor, such as the video preprocessor 120 in FIG. 1. The first CSF may comprise an achromatic CSF function. Additionally or alternatively, the CSF model may comprise a chromatic CSF function.

At step 640, a first filtered frame may be determined. The first filtered frame may be determined based at least in part on the first frame and the first CSF. Determining the first filtered frame may comprise removing the high spatial frequencies (chromatic, achromatic, or both) associated with the first frame. The high spatial frequencies may not be perceivable to a viewer. Determining the first filtered frame may comprise applying a filter to a spatial frequency band associated with the frame. The removed high spatial frequencies and/or the spatial frequency band may be indicated by the first CSF.

At step 650, a first viewing parameter may be determined. The viewing parameter may be associated with playback of video content. The first viewing parameter may comprise one or more of a viewing distance, a pixel density, a pixel length of a sinusoidal grating cycle, a width of a display associated with playback of the video content, a viewing angle, ambient illumination level, and a reflection coefficient of a display associated with playback of the video content.

At step 660, one or more of second luminance pixel data associated with the first filtered frame and second chrominance pixel data associated with the first filtered frame may be determined. The second luminance pixel data may comprise contrast sensitivity data for luminance of one or more pixels of the first filtered frame. The second chrominance pixel data may comprise contrast sensitivity data for chrominance (U and/or V channels) of one or more pixels of the first filtered frame.

At step 670, the first CSF may be modified (e.g., optimized). The first CSF may be modified for one or more pixels (e.g., each pixel) of the first filtered frame. The first CSF may be modified based on the first viewing parameter. The first CSF may be modified based on the one or more of second luminance pixel data and second chrominance pixel data. The first CSF may be modified with respect to achromatic data and/or chromatic data. Thus, the first CSF may comprise an achromatic CSF. Additionally or alternatively, the first CSF may comprise a chromatic CSF. Where the first CSF comprises a chromatic CSF, the first CSF may be based on one or more of the U channel and the V channel. Such modification may be accomplished by adaptively determining and setting corresponding minimal and maximal cut-off frequencies based on one or more of the desired characteristics, such as: a distance between the user and the display (e.g., HDR display); pixel density of the display; pixel length of a sinusoidal grating cycle being observed on the display; a viewing angle; an ambient illumination level; or a reflection coefficient of the display.

One or more of steps (620) to (670) may be repeated for a plurality of frames (e.g., select frames, every consequent video frame (e.g., HDR video frame), etc.), allowing adaptive customization for both achromatic CSF and chromatic CSF per each video frame based on the video frame content.

Systems, methods, and apparatuses are described for preprocessing video. Systems, methods, and apparatuses may comprise adaptive oblique perceptual coding of the HDR video content. By utilizing adaptive oblique perceptual coding, a significant reduction of an overall video bit-rate may be achieved with substantially no degradation in a perceived visual quality of the video content.

Coding of video frame details (e.g., objects, textures, lines, etc.) in different oblique directions may be carried out by applying an adaptive oblique filter. The HVS is less sensitive to oblique directions in comparison with horizontal or vertical directions. Therefore, the acuity of the oblique details within each video frame may be reduced to improve the performance of the video compression (such as the H.265/MPEG-HEVC-based compression) and to save computational complexity resources invested during a video compression stage without sacrificing the perceived visual quality of the video content.

Figure 7:
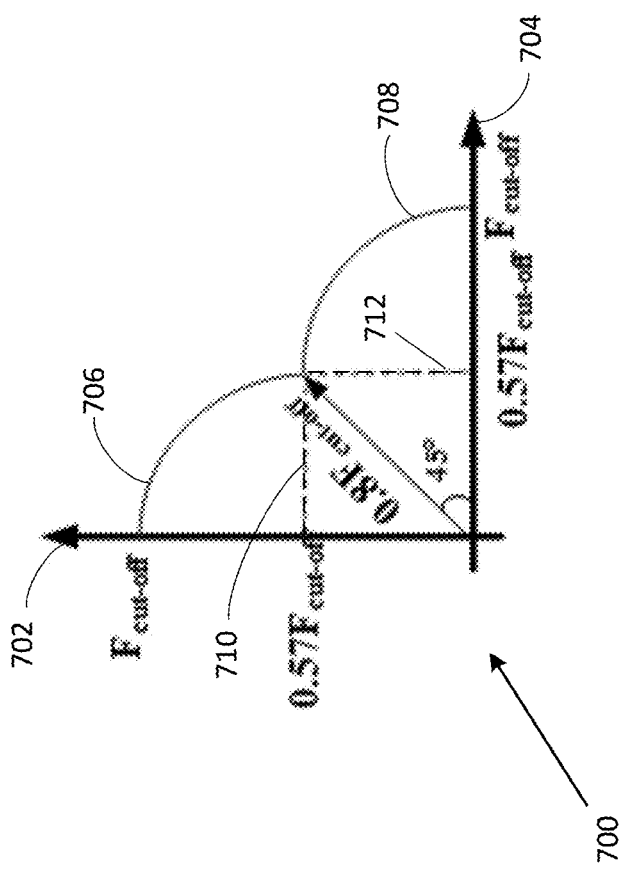
FIG. 7 is a graphical representation of example values used by a filter.

FIG. 7 shows a graphical representation 700 of example values used by an example filter. The graphical representation 700 may represent a shape of an oblique filter. The shape of the oblique filter in the graphical representation 700 may be considered a preferred or ideal shape under some circumstances. The graphical representation 700 of example values used by an example filter comprises a vertical axis 702. The vertical axis 702 may comprise values corresponding to a vertical position within a frame. The graphical representation 700 of example values used by an example filter comprises a horizontal axis 704. The horizontal axis 704 may comprise values corresponding to a horizontal position within a frame. A first arc 706 may begin at the vertical axis 702 (e.g., at $F_{cut-off}$) and terminate where the first arc 706 intersects a 45° line. Images beyond (e.g., above, to the right of, etc.) the first arc 706 may be filtered (e.g., partially filtered, completely filtered, etc.). A second arc 708 may begin at the horizontal axis 704 (e.g., at $F_{cut-off}$) and terminate where the second arc 708 intersects the 45° line. Images beyond (e.g., above, to the right of, etc.) the second arc 708 may be filtered (e.g., partially filtered, completely filtered, etc.). Images beyond the first arc 706 may be filtered by a first type of filter. Images beyond the second arc 708 may be filtered by the first type of filter. A horizontal line 710 may extend from the vertical axis 702 (e.g., at 0.57 $F_{cut-off}$) to the 45° line. Images above the horizontal line 710 may be filtered (e.g., partially filtered, completely filtered, etc.). A vertical line 712 may extend from the horizontal axis 704 (e.g., at 0.57 $F_{cut-off}$) to the 45° line. Images to the right of the vertical line 712 may be filtered (e.g., partially filtered, completely filtered, etc.). Images above the horizontal line 710 may be filtered by a second type of filter. Images to the right of the vertical line 712 may be filtered by the second type of filter. Other filters and arcs may be used.

Near the 45° line of an oblique filter, such as the filter represented in FIG. 7, a cut-off frequency may decrease because the HVS is least sensitive to objects, textures, lines, etc., which are located at 45°. The oblique filter may be designed as a combination of two or more low-pass filters, which may be adaptively applied to each video frame prior to the compression stage. The oblique filter may be a combination of two circularly symmetric Gaussian filters, comprising the following characteristics:

$$G(R_1) = e^{-\frac{(R_1-\mu_x)^2}{\sigma_1^2}},$$

for $R_1>0$ and $\sigma_1>0$, and $$G(R_2) = e^{-\frac{(R_2-\mu_y)^2}{\sigma_2^2}},$$

for $R_2>0$ and $\sigma_2>0$ where $R_1$ and $R_2$ are the radiuses of the first and second circularly symmetric Gaussian filters, respectively; $\sigma_1$ and $\sigma_2$ are the corresponding standard deviations of the Gaussian distributions; and $\mu_x$ and $\mu_y$ are the means that represent a shift on either horizontal or vertical axes, respectively. $\sigma_1$ and $\sigma_2$ may be predefined accordingly, such that the circularly symmetric Gaussian filter border is limited by the cut-off frequency $F_{cut-off}$. An example of two symmetric Gaussian filters is shown in FIG. 8.

Figure 8:
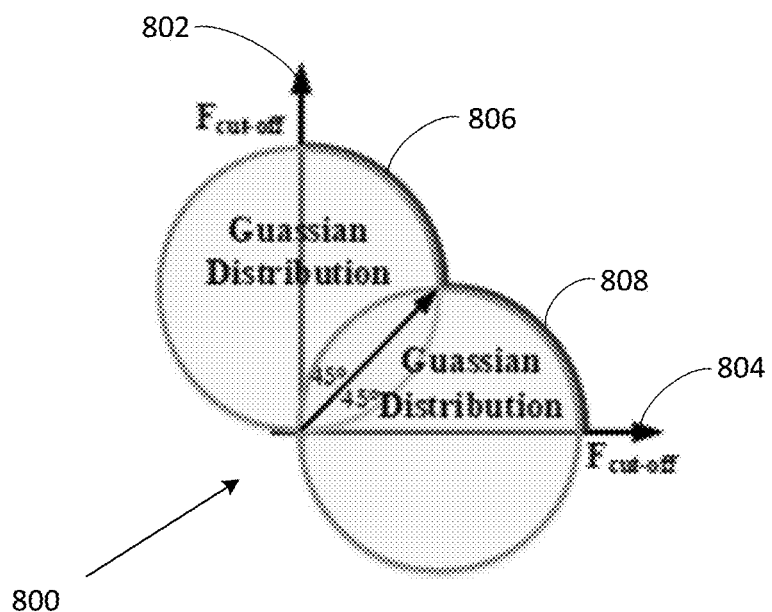
FIG. 8 is a graphical representation of example values used by a filter.

FIG. 8 shows a graphical representation 800 of example values used by an example filter. The graphical representation 800 may be related to the graphical representation 700 in FIG. 7. The graphical representation 800 of example values used by an example filter comprises a vertical axis 802. The vertical axis 802 may comprise values corresponding to a vertical position within a frame. The graphical representation 800 of example values used by an example filter comprises a horizontal axis 804. The horizontal axis 804 may comprise values corresponding to a horizontal position within a frame. A first arc 806 may begin at the vertical axis 802 and terminate where the first arc 806 intersects a 45° line. A first circular filter (e.g., Gaussian filter, etc.) bisected by the vertical axis 802 may comprise the first arc 806. The first arc 806 may correspond to the first arc 706 in FIG. 7. Images beyond (e.g., above, to the right of, etc.) the first arc 806 may be filtered (e.g., partially filtered, completely filtered, etc.). A second arc 808 may begin at the horizontal axis 804 and terminate where the second arc 808 intersects the 45° line. A second circular filter (e.g., Gaussian filter, etc.) bisected by the horizontal axis 804 may comprise the second arc 808. The second arc 808 may correspond to the second arc 708 in FIG. 7. Images beyond (e.g., above, to the right of, etc.) the second arc 808 may be filtered (e.g., partially filtered, completely filtered, etc.). Images beyond the first arc 806 may be filtered by a first type of filter. Images beyond the second arc 808 may be filtered by the first type of filter.

Figure 9:
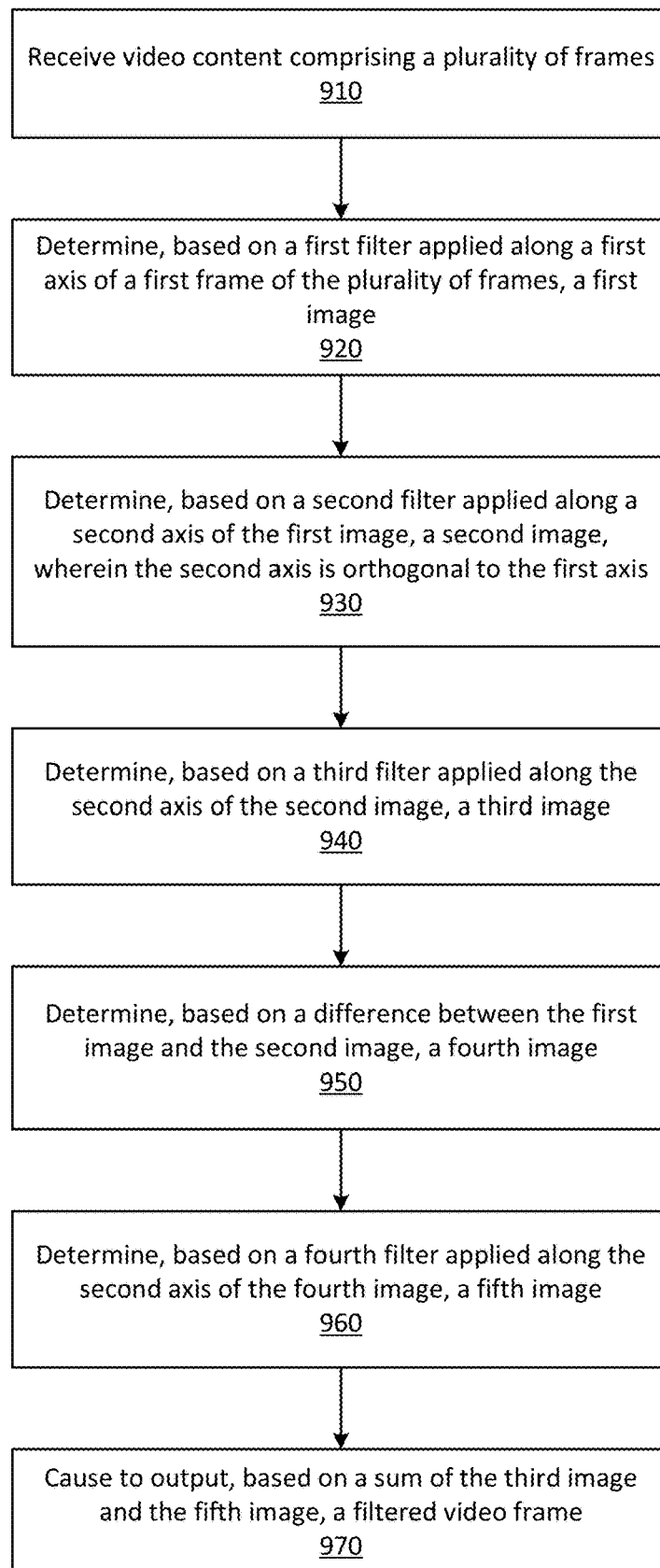
FIG. 9 is a flow diagram of a method.

FIG. 9 shows a flow diagram of a method. Video content may be received at step 910. For example, a video preprocessor, such as video preprocessor 120 in FIG. 1, may receive video content. The video content may comprise a plurality of frames.

At step 920, a first image may be determined (e.g., generated). For example, a video preprocessor, such as video preprocessor 120 in FIG. 1, may determine the first image. Determining the first image may be based on a first filter applied along a first axis of a first frame of the plurality of frames. For example, the first image may be determined by applying the first filter along the first axis of the first frame of the plurality of frames. The first filter may comprise a circular Gaussian filter. The first filter may comprise a square low-pass filter. A filter border of the first filter may be based on a cut-off frequency. The first filter may be represented by the graphical representation 700 described in reference to FIG. 7 above. The first filter may be represented by the graphical representation 800 described in reference to FIG. 8.

At step 930, a second image may be determined (e.g., generated). For example, a video preprocessor, such as video preprocessor 120 in FIG. 1, may determine the second image. Determining the second image may be based on a second filter applied along a second axis of the first image. For example, the second image may be determined by applying the second filter along the second axis of the first image. The second axis may be orthogonal to the first axis. The second filter may comprise a circular Gaussian filter. The second filter may comprise a square low-pass filter. The first filter may be symmetrical with the second filter. The first filter and the second filter may be the same filter. A filter border of the second filter may be based on a cut-off frequency. The second filter may be represented by the graphical representation 700 described in reference to FIG. 7. The second filter may be represented by the graphical representation 800 described in reference to FIG. 8 above.

At step 940, a third image may be determined (e.g., generated). For example, a video preprocessor, such as video preprocessor 120 in FIG. 1, may generate the third image. Determining the third image may be based on a third filter applied along the second axis of the second image. For example, the third image may be determined by applying the third filter along the second axis of the second image. The third filter may comprise a circular Gaussian filter. The third filter may comprise a square low-pass filter. The third filter may be symmetrical with the second filter. The first filter may be symmetrical with the third filter. The first filter and the third filter may be the same filter. The second filter and the third filter may be the same filter. A filter border of the third filter may be based on a cut-off frequency. The third filter may be represented by the graphical representation 700 described in reference to FIG. 7 above. The third filter may be represented by the graphical representation 800 described in reference to FIG. 8 above.

At step 950, a fourth image may be determined (e.g., generated). For example, a video preprocessor, such as video preprocessor 120 in FIG. 1, may determine the fourth image. The fourth image may be determined based on a difference between the first image and the second image.

At step 960, a fifth image may be determined (e.g., generated). For example, a video preprocessor, such as video preprocessor 120 in FIG. 1, may determine the fifth image. Determining the fifth image may be based on a fourth filter applied along the second axis of the fourth image. For example, the fifth image may be determined by applying the fourth filter along the second axis of the fourth image. The fourth filter may comprise a circular Gaussian filter. The fourth filter may comprise a square low-pass filter. The first filter may be symmetrical with the fourth filter. The second filter may be symmetrical with the fourth filter. The third filter may be symmetrical with the fourth filter. The first filter and the fourth filter may be the same filter. The second filter and the fourth filter may be the same filter. The third filter and the fourth filter may be the same filter. A filter border of the fourth filter may be based on a cut-off frequency. The fourth filter may be represented by the graphical representation 700 described in reference to FIG. 7 above. The fourth filter may be represented by the graphical representation 800 described in reference to FIG. 8 above.

At step 970, a filtered video frame may be caused to be output. For example, a video preprocessor, such as video preprocessor 120 in FIG. 1, may cause to output a filtered video frame to a video encoder, such as video encoder 130 in FIG. 1. The filtered video frame may be based on a sum of the third image and the fifth image. For example, causing to output the filtered video frame may be based on the sum of the third image and the fifth image.

As an example, a user may request video content via a video delivery system (e.g., a Video-On-Demand (VOD) system) via a user device. The request may be received at a server (e.g., a VOD server). The server may provide raw video to a video preprocessor. A frame of the video content may comprise an element in an oblique direction. The user may not be able to visually sense elements in an oblique direction as well as the user may be able to sense elements in a vertical or horizontal direction. An acuity of details of the frame in an oblique direction may be reduced, and the frame may be provided to a video encoder. With the acuity of the details of the frame in an oblique direction reduced, the video encoder may allocate bits more efficiently to encode the video content prior to transmitting the encoded video content to the user device.

Figure 10:
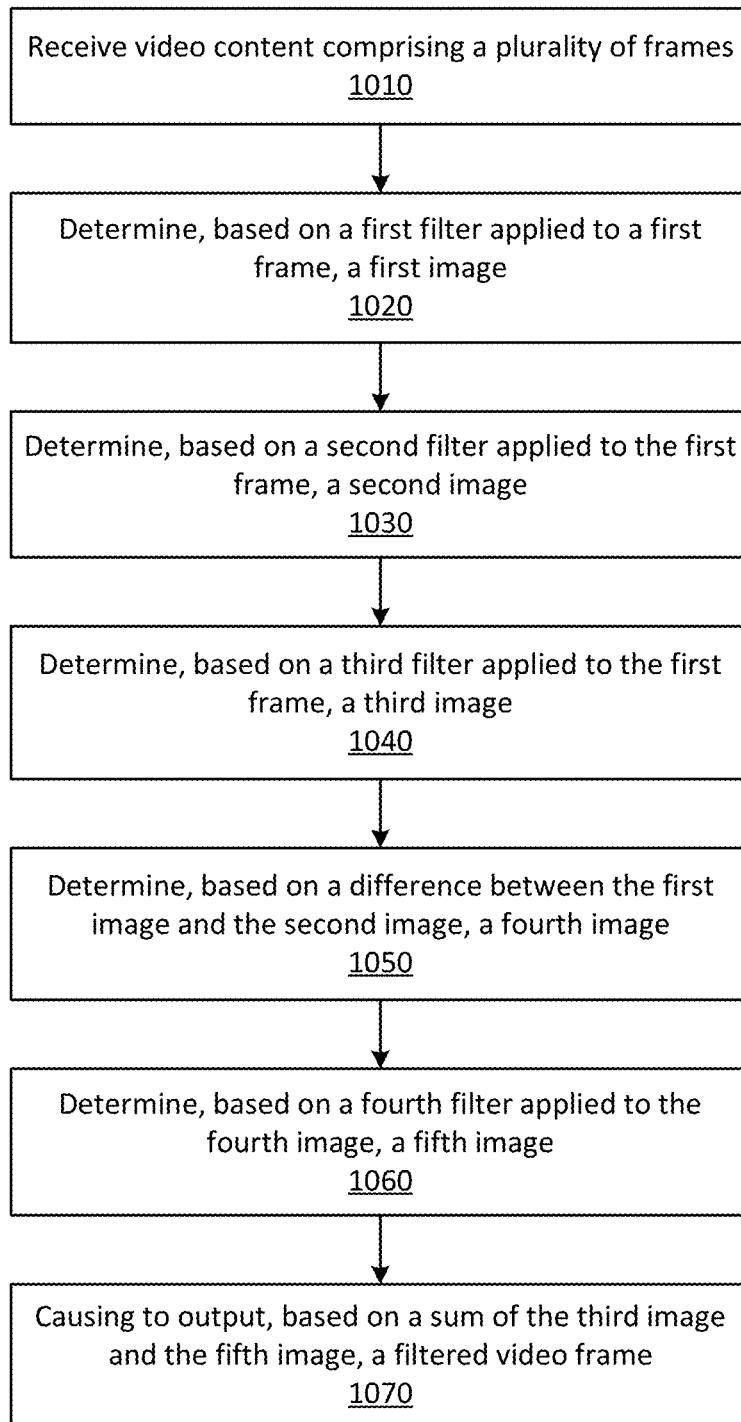
FIG. 10 is a flow diagram of a method.

FIG. 10 shows a flow diagram of a method. A filtering process may be applied to one or more frames of video. As an example, a 2D oblique filter in a form of two circularly symmetric Gaussian filters may be configured to operate as a basis for filtering a video frame. Alternatively, the oblique filter may be a combination of two or more square low-pass filters. The method shown in FIG. 10 may be applied based on various filter parameters.

At step 1010, video content may be received. For example, a video preprocessor, such as video preprocessor 120 in FIG. 1, may receive video content. The video content may comprise a plurality of frames.

At step 1020, a first image may be determined (e.g., generated). For example, a video preprocessor, such as video preprocessor 120 in FIG. 1, may generate a first image. Determining the first image may be based on a filter applied to a first frame of the plurality of frames. For example, the first image may be determined by applying the first filter to the first frame of the plurality of frames. The first image may be determined by applying a first filter along a first axis of a first frame of the plurality of frames. The first filter may comprise a circular Gaussian filter. The first filter may comprise a square low-pass filter. A filter border of the first filter may be based on a cut-off frequency. The first filter may be represented by the graphical representation 700 described in reference to FIG. 7 above. The first filter may be represented by the graphical representation 800 described in reference to FIG. 8. As an example, a 1D circularly symmetric Gaussian filter may be applied along the rows of the input video frame, while σ corresponds to $F_{cut-off}$, thereby obtaining a filtered picture $G_1$.

At step 1030, a second image may be determined (e.g., generated). For example, a video preprocessor, such as video preprocessor 120 in FIG. 1, may determine the second image. Determining the second image may be based on a second filter applied to the first image. For example, the second image may be determined by applying the second filter to the first image. The second image may be determined by applying the second filter along a second axis of the first image. The second axis may be orthogonal to the first axis. The second filter may comprise a circular Gaussian filter. The second filter may comprise a square low-pass filter. The first filter may be symmetrical with the second filter. The first filter and the second filter may be the same filter. A filter border of the second filter may be based on a cut-off frequency. The second filter may be represented by the graphical representation 700 described in reference to FIG. 7. The second filter may be represented by the graphical representation 800 described in reference to FIG. 8 above. As an example, a 1D circularly symmetric Gaussian filter may be applied along the columns of the input video frame, while σ corresponds to $0.57F_{cut-off}$, thereby obtaining a filtered picture $G_2$.

At step 1040, a third image may be determined (e.g., generated). For example, a video preprocessor, such as video preprocessor 120 in FIG. 1, may generate the third image. Determining the third image may be based on a third filter applied to the second image. For example, the third image may be determined by applying the third filter to the second image. The third image may be determined by applying a third filter along the second axis of the second image. The third filter may comprise a circular Gaussian filter. The third filter may comprise a square low-pass filter. The third filter may be symmetrical with the second filter. The first filter may be symmetrical with the third filter. The first filter and the third filter may be the same filter. The second filter and the third filter may be the same filter. A filter border of the third filter may be based on a cut-off frequency. The third filter may be represented by the graphical representation 700 described in reference to FIG. 7 above. The third filter may be represented by the graphical representation 800 described in reference to FIG. 8 above. As an example, a 1D circularly symmetric Gaussian filter may be applied along the columns of $G_2$, while σ corresponds to $F_{cut-off}$, thereby obtaining a filtered image $G_3$.

At step 1050, a fourth image may be determined (e.g., generated). For example, a video preprocessor, such as video preprocessor 120 in FIG. 1, may generate the fourth image. Determining the fourth image may be based on a difference between the first image and the second image.

At step 1060, a fifth image may be determined (e.g., generated). For example, a video preprocessor, such as video preprocessor 120 in FIG. 1, may generate the fifth image. Determining the fifth image may be based on a fourth filter applied to the fourth image. For example, the fifth image may be generated by applying a fourth filter to the fourth image. The fifth image may be determined by applying a fourth filter along the second axis of the fourth image. The fourth filter may comprise a circular Gaussian filter. The fourth filter may comprise a square low-pass filter. The first filter may be symmetrical with the fourth filter. The second filter may be symmetrical with the fourth filter. The third filter may be symmetrical with the fourth filter. The first filter and the fourth filter may be the same filter. The second filter and the fourth filter may be the same filter. The third filter and the fourth filter may be the same filter. A filter border of the fourth filter may be based on a cut-off frequency. The fourth filter may be represented by the graphical representation 700 described in reference to FIG. 7 above. The fourth filter may be represented by the graphical representation 800 described in reference to FIG. 8 above. As an example, a 1D circularly symmetric Gaussian filter may be applied along the columns of $G_4$, while σ corresponds to $0.57F_{cut-off}$, thereby obtaining a filtered picture $G_5$.

At step 1070, a filtered video frame may be caused to be output. For example, a video preprocessor, such as video preprocessor 120 in FIG. 1, may cause to output the filtered video frame to a video encoder, such as video encoder 130 in FIG. 1. Causing to output the filtered video frame may be based on at least a sum of the third image and the fifth image. For example, the filtered video frame may be based on at least the sum of the third image and the fifth image. The output filtered video frame may be a sum of both above filtered pictures: i.e. $G_3+G_5$.

Systems, methods, and apparatuses are described for processing video. Systems, methods, and apparatuses may comprise early termination of video frame partitioning and encoding, such as High Efficiency Video Coding (HEVC) Quadtree structure coding, by exploiting video content oblique characteristics. Early termination of HEVC Quadtree structure coding (or other types of coding) may significantly reduce an overall video bit-rate with substantially no degradation in the perceived visual quality.

As a non-limiting example, HEVC is a recent video compression standard, the first version of which was officially approved in 2013. In HEVC, each video frame may be first partitioned (e.g., divided, split, etc.) onto coding tree units (CTUs), each comprising one luma coding tree block (CTB) and two chroma coding tree blocks. A size of the CTB may be decided (e.g., selected, determined, defined, etc.) by an encoder. For example, a size of 64×64 pixels may be decided by an encoder. A CTB may be partitioned onto smaller blocks, called coding blocks (CBs), by employing a Quadtree structure. The root of the Quadtree structure may be associated with a CTB. A CTB may comprise one CB or may be partitioned onto multiple CBs. A CB may be partitioned into prediction units (PUs). A CB may be recursively partitioned into transform units (TUs) using a Residual Quadtree (RQT) structure. By comparing the Rate-Distortion (RD) costs of possible partitions, a best RQT mode may be selected.

An HEVC encoding process may consume significant computational resources due to performing an exhaustive search for a best coding mode—i.e., checking a large number of possible coding modes for each coding/transform block in order to determine the best coding mode. The best coding mode may be determined by partitioning a Quadtree structure to achieve a best prediction unit (PU), and then by recursively partitioning an RQT structure to determine a best transform unit size for a corresponding residual signal. The process of determining the best coding mode may be performed to obtain a smallest coding residual as a function of determining a best matching prediction unit (PU), thereby improving the coding gain/efficiency. To make the encoding process faster and to reduce valuable computational complexity resources invested during the encoding stage, early termination methods may be applied during the HEVC encoding process, thereby reducing the overall number of the above-mentioned partitionings and, in turn, a reduction in corresponding checks to determine a best coding mode. However, reducing the number of partitionings and the number of checks may also reduce chances to get a smallest possible coding residual for coding the CTUs and/or the CUs (i.e., reduces chances to encode the CTUs/CUs in an optimal manner). Reducing the number of partitionings and the number of checks may lead to a decrease of encoding gain as a trade-off for increased encoding speed. Therefore, it may be advantageous to utilize early termination when there is no impact on the coding gain or the impact is relatively small.

The HVS may be less sensitive to oblique directions (e.g., less sensitive to objects rotated by 25°-65° relative to a horizontal axis and/or a vertical axis, less sensitive to objects rotated by 115°-155° relative to a horizontal axis and/or a vertical axis, etc.). A position of elements (e.g., objects, items, textures, lines, etc.) within a video frame may be determined. When an element is determined to be positioned in an oblique position, the coding of the CTUs and the CUs that correspond to the element may be performed in a faster manner—i.e. by applying an early termination of Quadtree structure partitioning and/or RQT structure partitioning in order to save valuable computational resources.

Figure 11:
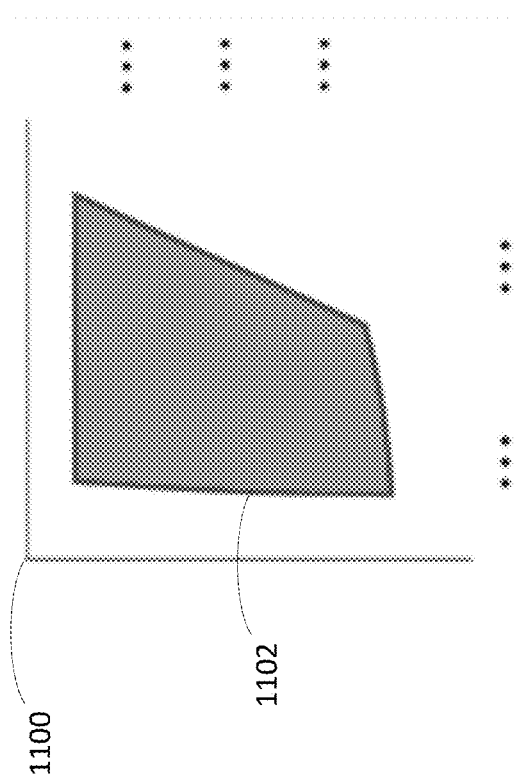
FIG. 11 is an element in a frame.
Figure 12:
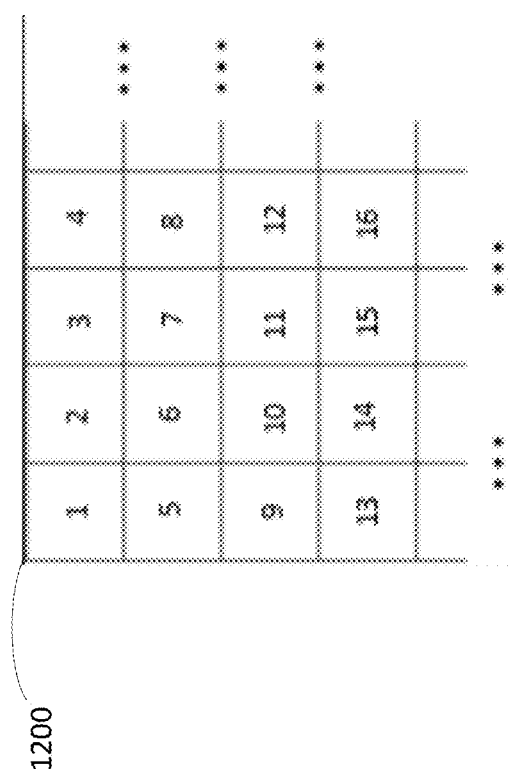
FIG. 12 is a frame comprising partitions.
Figure 13:
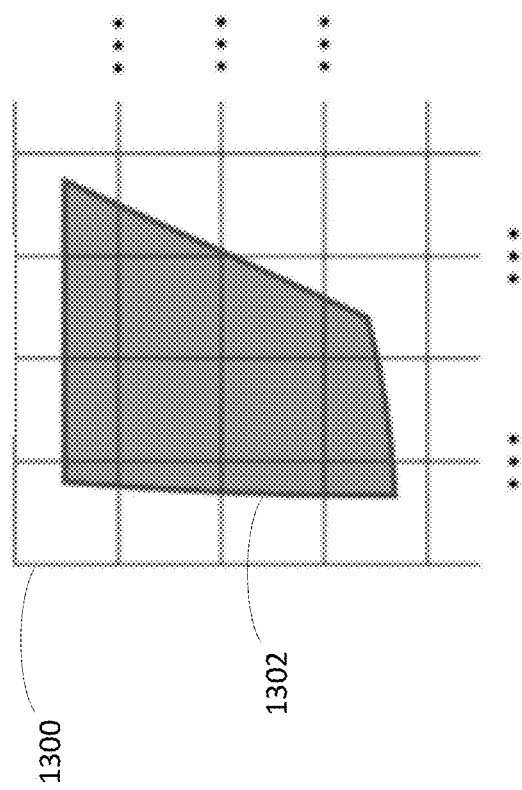
FIG. 13 is a frame comprising partitions and an element.
Figure 14:
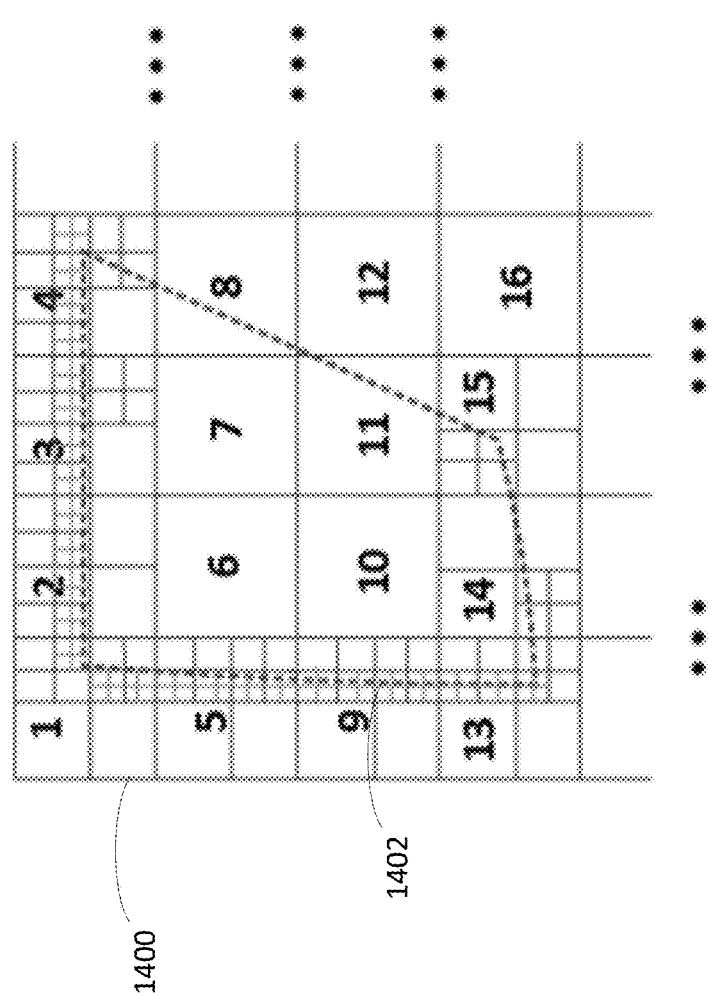
FIG. 14 is a frame comprising partitions and an element.

FIGS. 11-14 show a processing technique (e.g., partitioning). Such processing may be executed as part of a preprocessing step or coding, or other processing domains. FIG. 11 shows a portion of a frame 1100. As shown, the portion of the frame 1100 comprises an element 1102. The element 1102 may comprise a group of pixels or a portion of a frame such as an edge or boundary of an element in the frame. FIG. 12 shows a portion of a frame 1200. The portion of the frame 1200 may correspond to the portion of the frame 1100 in FIG. 11. As shown, the portion of the frame 1200 comprises 16 partitioned units. FIG. 13 shows a portion of a frame 1300. The portion of the frame 1300 may correspond to the portion of the frame 1100 in FIG. 11 or the portion of the frame 1200 in FIG. 12. The portion of the frame 1300 may comprise an element 1302. The element 1302 may correspond to the element 1102 in FIG. 11. Like the portion of the frame 1200 in FIG. 12, the portion of the frame 1300 may comprise 16 partitioned units. However, this is for example only and other partitioned units may be used. Turning finally to FIG. 14, a portion of a frame 1400 is shown. The portion of the frame 1400 may correspond to the portion of the frame 1100 in FIG. 11 or the portion of the frame 1200 in FIG. 12 or the portion of the frame 1300 in FIG. 13. The portion of the frame 1400 may comprise an element 1402. The element 1402 may correspond to the element 1102 in FIG. 11 or the element 1302 in FIG. 13. Like the portion of the frame 1200 in FIG. 12 and the portion of the frame 1300 in FIG. 13, the portion of the frame 1400 may comprise 16 partitioned units. However, this is for example only and other partitioned units may be used. As shown, for example, the partitioned units that comprise no boundary of the element 1402 (partitioned units 6, 7, 10, and 16) and a boundary of the element 1402 in only an oblique position (partitioned units 8, 11, and 12) may comprise no further partitioning. The partitioned units that comprise a boundary of the element 1402 in a non-oblique position (partitioned units 1, 2, 3, 4, 5, 9, 13, 14, and 15) may comprise further partitioning. The partitioned units that comprise a boundary of the element 1402 in a vertical (or near vertical) position (partitioned units 1, 5, 9, and 13) or in a horizontal (or near horizontal) position (partitioned units 1, 2, 3, and 4) may comprise more partitioning than other partitioned units. Other partitioning techniques may be used.

Figure 15:
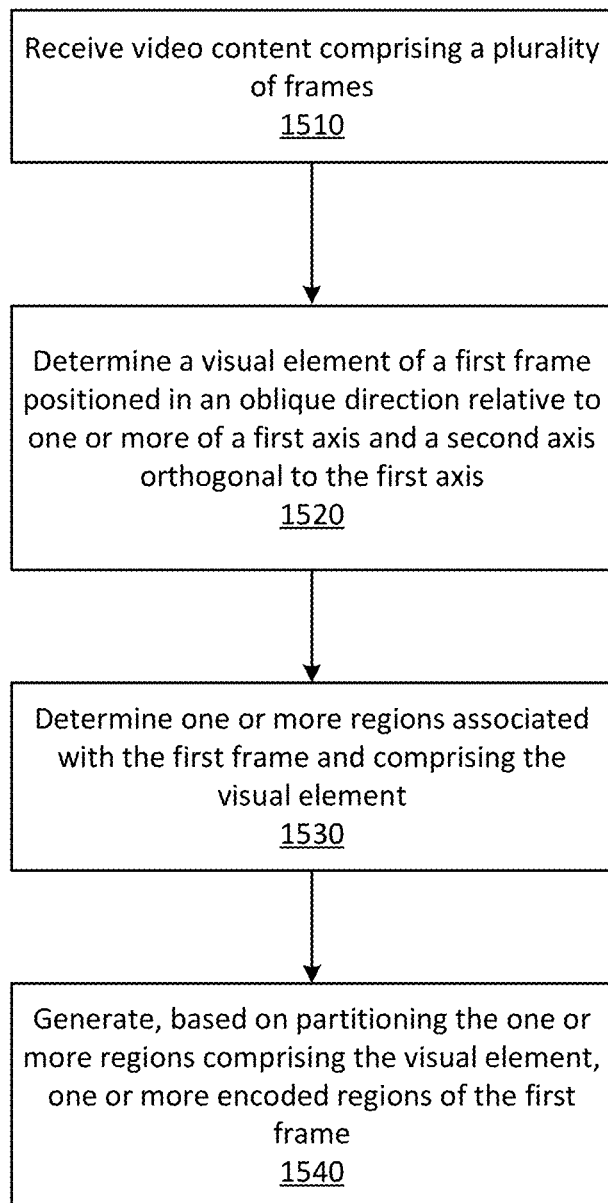
FIG. 15 is a flow diagram of a method.

FIG. 15 shows a flow diagram of a method. Video content may be received at step 1510. For example, a video preprocessor, such as video preprocessor 120 in FIG. 1, may receive video content. The video content may comprise a plurality of frames. The video content may comprise HDR video content.

At step 1520, a visual element of a first frame, of the plurality of frames, positioned in an oblique direction relative to one or more of a first axis and a second axis orthogonal to the first axis may be determined. The determining the visual element of the first frame may comprise determining an edge of the visual element. The edge may be positioned in an oblique direction relative to the first axis. The edge may be positioned in an oblique direction relative to the second axis. The determining the edge of the visual element may comprise applying a high-pass filter to the first frame. The determining the edge of the visual element may comprise applying a low-pass filter to the first frame. The determining the visual element of the first frame positioned in an oblique direction relative to one or more of the first axis and the second axis may comprise determining that the rotational orientation of the visual element is 25-65 degrees relative to the first axis. The determining the visual element of the first frame positioned in an oblique direction relative to one or more of the first axis and the second axis may comprise determining that the rotational orientation of the visual element is 25-65 degrees relative to the second axis. The determining the visual element of the first frame positioned in an oblique direction relative to one or more of the first axis and the second axis may comprise determining that the rotational orientation of the visual element is 115-155 degrees relative to the first axis. The determining the visual element of the first frame positioned in an oblique direction relative to one or more of the first axis and the second axis may comprise determining that the rotational orientation of the visual element is 115-155 degrees relative to the second axis. FIG. 11 shows an example visual element in a frame.

At step 1530, one or more regions may be determined. The one or more regions may be associated with the first frame. The one or more regions may be determined by partitioning the first frame. The first frame may be partitioned into a plurality of regions, which may comprise the one or more regions. The first frame of the plurality of frames may be partitioned into a plurality of regions as shown in FIG. 12. The one or more regions may comprise the visual element. FIG. 13 shows an example frame with one or more regions comprising a visual element.

At step 1540, one or more encoded regions of the first frame may be generated. Generating the one or more encoded regions may be based on partitioning the one or more regions comprising the visual element. For example, the one or more regions may be partitioned based on the determining the one or more regions comprising the visual element. A quantity of sub-partitions of each of the one or more regions determined from the partitioning the one or more regions may be based on the determining the one or more regions comprising the visual element. The plurality of regions may comprise a plurality of coding tree units (CTUs). The sub-partitions each may comprise a coding unit (CU). The partitioning the one or more regions may comprise quadtree structure partitioning. The partitioning the one or more regions may comprise Residual Quadtree (RQT) partitioning. A coding depth level of the quadtree structure partitioning may be based on the determining the one or more regions comprising the visual element. A coding depth level of the RQT partitioning may be based on the determining the one or more regions comprising the visual element. FIG. 14 shows an example partitioning of one or more regions based on the one or more regions comprising a visual element.

The first frame may be encoded. For example, a video encoder, such as video encoder 130 in FIG. 1, may encode the first frame. The first frame may be encoded based on the partitioning the one or more regions. The encoding or preprocessing (or other process) may leverage the partitioning techniques described herein.

A user may request video content via a video delivery system (e.g., a Video-On-Demand (VOD) system), such as via a user device. The request may be received at a server (e.g., VOD server). The server may provide raw video to a video preprocessor. The raw video data may comprise the requested video content. A portion of a frame of the video content may comprise an element in an oblique position. The user may not be able to visually sense elements in an oblique position as well as the user may be able to sense elements in a vertical or horizontal position. Portions of the frame with an element in an oblique position may be partitioned in bigger segments than other portions of the frame. The partitioned frame may be provided to a video encoder. With portions of the frame with an element in an oblique position partitioned in bigger segments, such portions may receive less granularity when encoding customization is considered by an encoder. Thus, the video encoder may allocate more resources to encoding portions of the frame that do not comprise an element in an oblique position when encoding the video content prior to transmitting the encoded video content to the user device. The partitioning the portion of the frame based at least in part on the oblique element may allow for a reduced size of the resultant encoded video data. A reduction in the size of the encoded video data may be enabled by the reduced number of bits needed to indicate the larger partitions corresponding to the oblique element and/or the diverted computational resources providing enhanced compression to the portions of the frame other than the oblique element.

A user may request video content via a server (e.g., a VOD server), such as via a user device. The server may provide raw video data, comprising the requested video content, to a video encoder, such as the video encoder 130 in FIG. 1. A portion of a frame of the video content may comprise an element in an oblique position. The portion of the frame may be processed to determine the oblique element (e.g., determine the location and/or coordinates of the oblique element within the frame). The processing may determine the oblique element according to various image recognition and/or edge detection techniques. The video encoder may determine the oblique element in the portion of the frame, such as during and/or part of the video encoder's encoding process. Another component, such as a pre-processor, may determine the oblique element. The other component may indicate the oblique element to the video encoder, such as via metadata associated with the raw or preprocessed video data provided to the video encoder. The video encoder may partition the portion of the frame based at least in part on the oblique element. The video encoder may encode other portions of the frame based on other oblique elements in the other portions of the frame, if so present. The video encoder may encode other frames of the video data based at least in part on other oblique elements within those frames, if so present. The video encoder may output the encoded video data and send the encoded video data to a video decoder. The decoder may be associated with the requesting user and/or the user's associated user device. The decoder may decode the encoded video data and cause output of the video content, which may be viewed by the user.

A user may request video content via a server (e.g., a VOD server), such as via a user device. The server may provide raw video data, comprising the video content, to a video encoder, such as the video encoder 130 in FIG. 1. The video encoder may encode the raw video data to determine encoded video data. The encoder may encode at least a portion of the raw video data (e.g., a portion of a frame of the raw video data) based at least in part on a determined oblique element in the portion of video data. The video encoder may provide the encoded video data to a video decoder, such as a video decoder associated with the user and/or the user device. The video decoder may decode at least a portion of the encoded video data (e.g., a portion of a frame of the encoded video data) based at least in part on an oblique element in the portion of the encoded video data. The video decoder may decode the portion of the encoded video data at least in part by re-partitioning the portion of the encoded video data comprising the oblique element. The re-partitioning the portion of the encoded video data may comprise re-partitioning the portion of the encoded video data in bigger segments. The oblique element may be determined by the video decoder, the video encoder, and/or the preprocessor. The oblique element may be indicated to the video decoder via metadata associated with the video data. The decoder may decode the encoded video data and cause output of the decoded video content, which may be viewed by the user.

Figure 16:
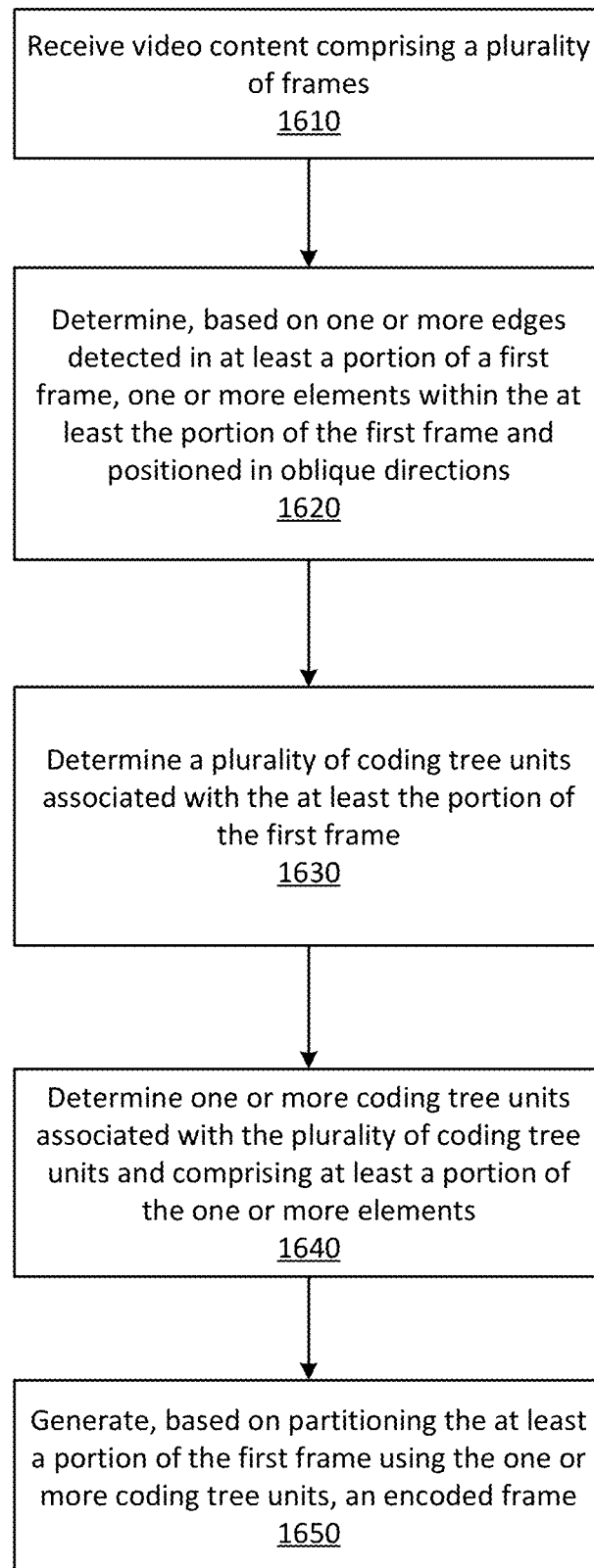
FIG. 16 is a flow diagram of a method.

FIG. 16 shows a flow diagram of a method. Video content may be received at step 1610. The video content may comprise a plurality of frames. The video content may comprise HDR video content. At step 1620, one or more elements within at least a portion of a first frame of the plurality of frames may be determined. The one or more elements within the at least the portion of the first frame may be positioned in oblique directions relative to one or more of a first axis and a second axis orthogonal to the first axis. Determining the one or more elements may be based on one or more edges detected in the at least the portion of the first frame. The one or more edges may define at least one boundary to a region of the first frame. The one or more edges may be detected via performing edge detection on the at least the portion of the first frame. FIG. 11 shows an element within a frame. FIG. 12 shows regions within a frame. FIG. 13 shows an element within a frame partitioned into regions.

At step 1630, a plurality of coding tree units (CTUs) associated with the at least the portion of the first frame may be determined. At step 1640, one or more coding tree units associated with the plurality of coding tree units may be determined. The determined one or more coding tree units may comprise at least a portion of the one or more elements. At step 1650, an encoded frame may be generated. The encoded frame may be generated based on partitioning the at least a portion of the first frame using the one or more coding tree units. FIG. 14 shows partitioning of a frame.

A user may request video content via a video delivery system (e.g., a Video-On-Demand (VOD) system) via a user device. The request may be received at a server (e.g., a VOD server). The server may provide raw video to a video preprocessor. A portion of a frame of the video content may comprise an element in an oblique position. The user may not be able to visually sense elements in an oblique position as well as the user may be able to sense elements in a vertical or horizontal position. Portions of the frame with an element in an oblique position may be partitioned in bigger segments than other portions of the frame. The partitioned frame may be provided to a video encoder. With portions of the frame with an element in an oblique position partitioned in bigger segments, such portions may receive less granularity when encoding customization is considered by an encoder. Thus, the video encoder may allocate more resources to encoding portions of the frame that do not comprise an element in an oblique position when encoding the video content prior to transmitting the encoded video content to the user device.

A user may request video content via a server (e.g., a VOD server), such as via a user device. The server may provide raw video data, comprising the requested video content, to a video encoder, such as the video encoder 130 in FIG. 1. A portion of a frame of the video content may comprise an element in an oblique position. The portion of the frame may be processed to determine the oblique element (e.g., determine the location and/or coordinates of the oblique element within the frame). The video encoder may determine the oblique element in the portion of the frame, such as during and/or part of the video encoder's encoding process. The video encoder may partition the portion of the frame based at least in part on the oblique element. The video encoder may output the encoded video data and send the encoded video data to a video decoder.

A user may request video content via a server (e.g., a VOD server), such as via a user device. The server may provide raw video data, comprising the video content, to a video encoder. The video encoder may encode the raw video data to determine encoded video data. The video encoder may provide the encoded video data to a video decoder. The video decoder may decode at least a portion of the encoded video data (e.g., a portion of a frame of the encoded video data) based at least in part on an oblique element in the portion of the encoded video data. The video decoder may decode the portion of the encoded video data at least in part by re-partitioning the portion of the encoded video data comprising the oblique element. The re-partitioning the portion of the encoded video data may comprise re-partitioning the portion of the encoded video data in bigger segments. The decoder may decode the encoded video data and cause output of the decoded video content, which may be viewed by the user.

Figure 17:
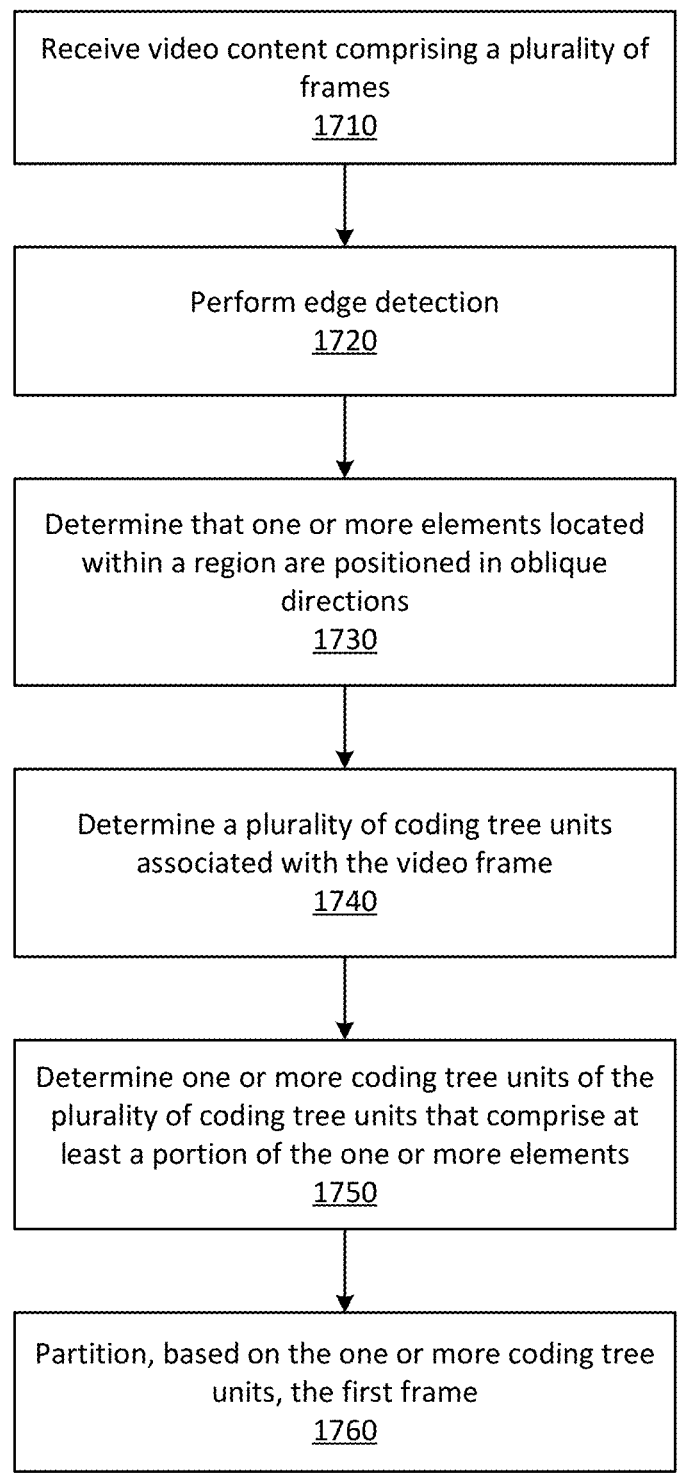
FIG. 17 is a flow diagram of a method.

FIG. 17 shows an example method for early termination of HEVC Quadtree structure partitioning by exploiting oblique characteristics of video content (e.g., HDR video content). At step 1710, video content may be received. The video content may comprise a plurality of frames.

At step 1720, an edge detection may be performed with respect to one or more video frames. Edge detection may be performed within one or more video frames (e.g., or each video frame) by applying a high-pass/band-pass filter to the video frame. The high-pass/band-pass filter may be or comprise a Gabor filter, a Sobel filter, a Canny filter, or a Prewitt filter with a predefined kernel matrix size. Other filters may be used.

At step 1730, one or more elements associated with (e.g., within) a video frame or a region of a frame may be determined to be disposed (e.g., positioned and/or oriented) in oblique directions. Oblique directions may be or comprise under 25°-65° or 115°-155° relative to the video frame horizontal axis and/or vertical axis. Other ranges of directionality may be used.

At step 1740, a plurality of coding tree units (CTUs) associated with the video frame may be determined. The video frame may comprise the plurality of CTUs. The plurality of CTUs may be determined by dividing the video frame into the plurality of CTUs. Each CTU may comprise, for example, 64×64 pixels. At step 1750, one or more CTU's of the plurality of CTUs may be determined that comprise at least a portion of the one or more elements determined to be in disposed in oblique positions.

At step 1760, the first frame may be partitioned based on the one or more CTUs. Partitioning the first frame may comprise one or more of the Quadtree structure partitioning and additional RQT structure partitioning. The one or more of the Quadtree structure partitioning and the additional RQT structure partitioning may be reduced, such as to a particular coding depth level. For example, a number of checks to be done for determining a best coding mode may be reduced to a threshold. This threshold may be set, for example, based on (e.g., in accordance with) a particular angle under which the corresponding elements are positioned within the video frame. A smallest number of Quadtree structure partitionings and RQT structure partitionings may be utilized when an element is positioned in the video frame under or close to an angle of 45° or 135° relative to the horizontal axis and/or the vertical axis. However, other rules may be implemented based on coding depth and position of the elements within the frames. One of such methods may comprise terminating the process of checking partitioning options based on determining that the Quadtree structure partitionings have no strong edges, where edge strength is a parameter applied to one or more of the filters used to perform the edge detection.

Utilization of the early termination method described above may result in a significant reduction of overall encoding computational complexity (and, in turn, a significant increase in the encoding speed) without substantially any visible degradation in the decoded image quality. Utilization of the early termination method may reduce the size of the encoded video data.

Figure 18:
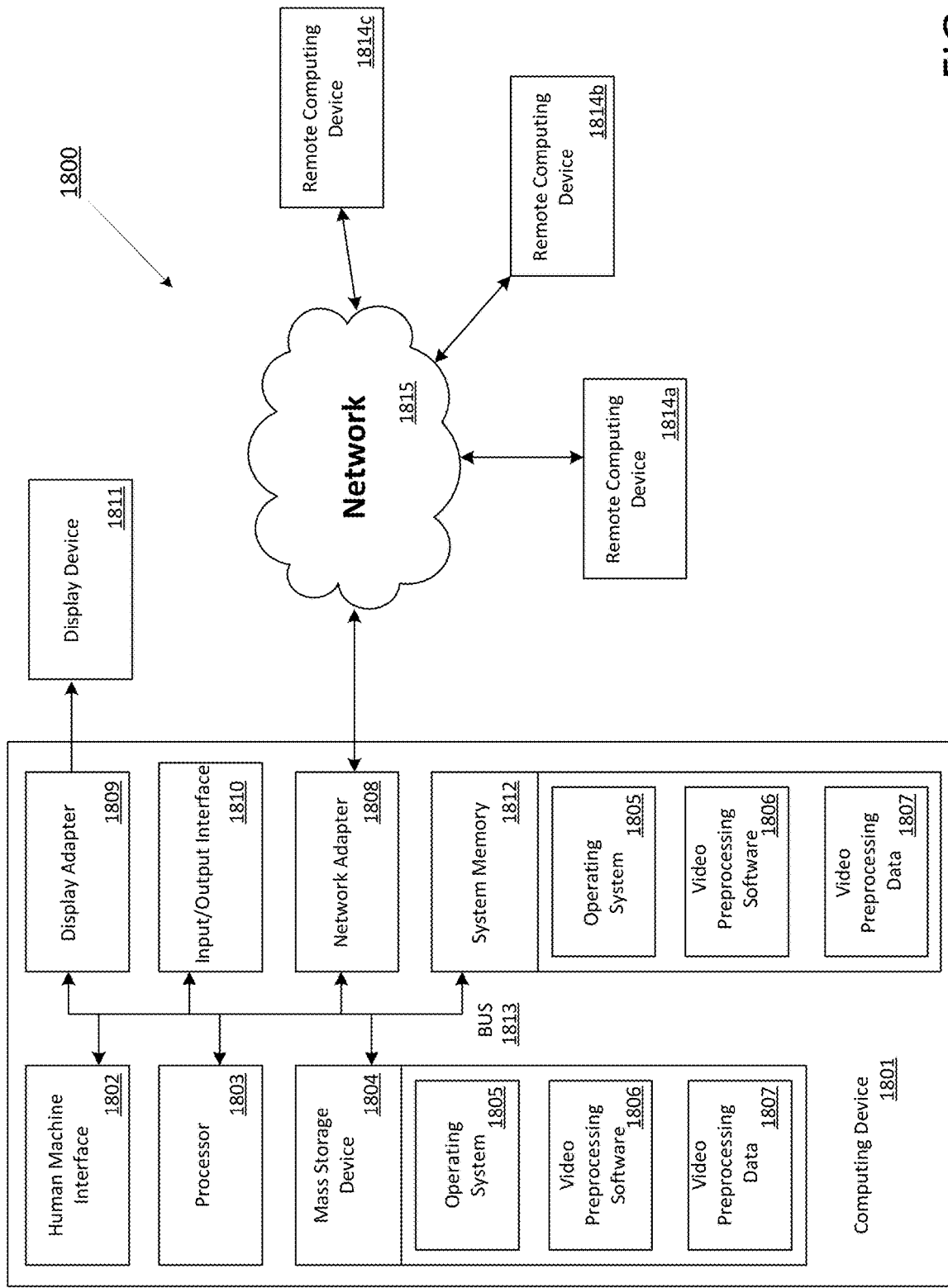
FIG. 18 is a block diagram of a system environment.

Referring to FIG. 18, an example operating environment 1800 may comprise an example of an operating environment and is not intended to suggest any limitation as to the scope of use or functionality of operating environment architecture. Neither should the operating environment be interpreted as having any dependency or requirement relating to any one or combination of components shown in the example operating environment.

The present systems, methods, and apparatuses may be operational with numerous other general purpose or special purpose computing system environments or configurations. Examples of well-known computing systems, environments, and/or configurations that may be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems may be performed by software components. The disclosed systems and methods may be described in the general context of computer-executable instructions, such as program modules, being executed by one or more computers or other devices. Generally, program modules comprise computer code, routines, programs, objects, components, data structures, etc. that performs particular tasks or implements particular abstract data types. The disclosed methods may be practiced in grid-based and distributed computing environments where tasks may be performed by remote processing devices that are linked through a communications network. In a distributed computing environment, program modules may be located in both local and remote computer storage media including memory storage devices.

Further, the systems, methods, and apparatuses disclosed may be implemented via a general-purpose computing device in the form of a computing device 1801. The components of the computing device 1801 may comprise, but are not limited to, one or more processors or processing units 1803, a system memory 1812, and a system bus 1813 that couples various system components including the processor 1803 to the system memory 1812. In the case of multiple processing units 1803, the system may utilize parallel computing.

The system bus 1813 represents one or more of several possible types of bus structures, including a memory bus or memory controller, a peripheral bus, an accelerated graphics port, and a processor or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI- Express bus, a Personal Computer Memory Card Industry Association (PCMCIA), Universal Serial Bus (USB) and the like. The bus 1813, and all buses specified in this description may be implemented over a wired or wireless network connection and each of the subsystems, including the processor 1803, a mass storage device 1804, an operating system 1805, video preprocessing software 1806, video preprocessing data 1807, a network adapter 1808, system memory 1812, an Input/Output Interface 1810, a display adapter 1809, a display device 1811, and a human machine interface 1802, may be contained within one or more remote computing devices 1814a,b,c at physically separate locations, connected through buses of this form, in effect implementing a fully distributed system.

The computing device 1801 typically comprises a variety of computer readable media. Example readable media may be any available media that is accessible by the computing device 1801 and comprises, for example and not meant to be limiting, both volatile and non-volatile media, removable and non-removable media. The system memory 1812 comprises computer readable media in the form of volatile memory, such as random access memory (RAM), and/or non-volatile memory, such as read only memory (ROM). The system memory 1812 typically contains data such as video preprocessing data 1807 and/or program modules such as operating system 1805 and video preprocessing software 1806 that are immediately accessible to and/or are presently operated on by the processing unit 1803.

The computing device 1801 may comprise other removable/non-removable, volatile/non-volatile computer storage media. By way of example, FIG. 18 shows a mass storage device 1804 which may provide non-volatile storage of computer code, computer readable instructions, data structures, program modules, and other data for the computing device 1801. For example and not limitation, a mass storage device 1804 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 1804, including by way of example, an operating system 1805 and video preprocessing software 1806. Each of the operating system 1805 and video preprocessing software 1806 (or some combination thereof) may comprise elements of the programming and the video preprocessing software 1806. Video preprocessing data 1807 may be stored on the mass storage device 1804. Video preprocessing data 1807 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple systems.

The user may enter commands and information into the computing device 1801 via an input device (not shown). Examples of such input devices may comprise, but are not limited to, a keyboard, pointing device (e.g., a "mouse"), a microphone, a joystick, a scanner, tactile input devices such as gloves, and other body coverings, and the like These and other input devices may be connected to the processing unit 1803 via a human machine interface 1802 that is coupled to the system bus 1813, but may be connected by other interface and bus structures, such as a parallel port, game port, an IEEE 1394 Port (also known as a Firewire port), a serial port, or a universal serial bus (USB).

A display device 1811 may be connected to the system bus 1813 via an interface, such as a display adapter 1809. It is contemplated that the computing device 1801 may have more than one display adapter 1809 and the computer 1801 may have more than one display device 1811. For example, a display device may comprise a monitor, an LCD (Liquid Crystal Display), or a projector. In addition to the display device 1811, other output peripheral devices may comprise components such as speakers (not shown) and a printer (not shown) which may be connected to the computing device 1801 via Input/Output Interface 1810. Any step and/or result of the methods may be output in any form to an output device. Such output may comprise any form of visual representation, including, but not limited to, textual, graphical, animation, audio, tactile, and the like. The display 1811 and computing device 1801 may comprise part of one device, or separate devices.

The computing device 1801 may operate in a networked environment using logical connections to one or more remote computing devices 1814a,b,c. By way of example, a remote computing device may comprise a personal computer, portable computer, a smart phone, a server, a router, a network computer, a peer device or other common network node. Logical connections between the computing device 1801 and a remote computing device 1814a,b,c may be made via a network 1815, such as a local area network (LAN) and a general wide area network (WAN). Such network connections may be through a network adapter 1808. A network adapter 1808 may be implemented in both wired and wireless environments. Such networking environments are conventional and commonplace in dwellings, offices, enterprise-wide computer networks, intranets, and the Internet.

For purposes of illustration, application programs and other executable program components such as the operating system 1805 are shown herein as discrete blocks, although such programs and components may reside at various times in different storage components of the computing device 1801, and may be executed by the data processor(s) of the computer. An implementation of video preprocessing software 1806 may be stored on or transmitted across some form of computer readable media. Any of the disclosed methods may be performed by computer readable instructions embodied on computer readable media. Computer readable media may comprise any available media that may be accessed by a computer. By way of example and not limitation, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Example computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

The invention claimed is:
1. A method comprising:
  determining at least one visual element oriented in an oblique direction within at least one frame; and encoding the at least one frame based on a coding depth level, wherein the coding depth level is based on determining the at least one visual element oriented in the oblique direction.

2. The method of claim 1, wherein the at least one visual element oriented in the oblique direction is located within a region of the frame, and wherein encoding the at least one frame based on the coding depth level comprises encoding the region of the at least one frame based on the coding depth level.

3. The method of claim 1, wherein encoding the at least one frame based on the coding depth level comprises:
encoding a first region, of the at least one frame, associated with the at least one visual element oriented in the oblique direction based on a first coding depth level; and
encoding a second region, of the at least one frame, associated with at least one visual element oriented in a non-oblique direction based on a second coding depth level that is different from the first coding depth level.

4. The method of claim 3, wherein a size of the encoded first region is less than a size of the encoded second region.

5. The method of claim 1, wherein the at least one visual element oriented in the oblique direction is located within a region of the frame, and wherein encoding the at least one frame based on the coding depth level results in a reduced size of encoded data associated with the region of the frame.

6. The method of claim 1, wherein the at least one visual element oriented in the oblique direction is located within a first region, of a plurality of regions, of the frame, and wherein the coding depth level is associated with a first quantity of partitions that is different from a second quantity of partitions associated with a second region, of the plurality of regions, of the frame.

7. The method of claim 1, wherein the coding depth level based on the at least one visual element oriented in the oblique direction is less than a coding depth level associated with a visual element oriented in a non-oblique direction.

8. The method of claim 1, wherein the coding depth level based on the at least one visual element oriented in the oblique direction facilitates encoding at least a region of the at least one frame using less computational resources than another region of the at least one frame.

9. The method of claim 1, wherein determining the at least one visual element oriented in the oblique direction within the at least one frame comprises at least one of:
applying an oblique filter to the at least one frame;
determining an edge of the at least one visual element;
applying at least one of a high-pass filter, a band-pass filter, or a low-pass filter to the at least one frame;
determining that a rotational orientation of the at least one visual element is 25-65 degrees from at least one of a first axis of the at least one frame or a second axis of the at least one frame, wherein the second axis is orthogonal to the first axis; or
determining that a rotational orientation of the at least one visual element is 115-155 degrees from at least one of a first axis of the at least one frame or a second axis of the at least one frame, wherein the second axis is orthogonal to the first axis.

10. The method of claim 1, further comprising sending the encoded frame for output via a computing device.

11. A non-transitory computer-readable medium storing instructions that, when executed, cause:
determining at least one visual element oriented in an oblique direction within at least one frame; and
encoding the at least one frame based on a coding depth level, wherein the coding depth level is based on determining the at least one visual element oriented in the oblique direction.

12. The non-transitory computer readable medium of claim 11, wherein the at least one visual element oriented in the oblique direction is located within a region of the frame, and wherein the instructions that cause encoding the at least one frame based on the coding depth level cause encoding the region of the at least one frame based on the coding depth level.

13. The non-transitory computer readable medium of claim 11, wherein the instructions that cause encoding the at least one frame based on the coding depth level cause:
encoding a first region, of the at least one frame, associated with the at least one visual element oriented in the oblique direction based on a first coding depth level; and
encoding a second region, of the at least one frame, associated with at least one visual element oriented in a non-oblique direction based on a second coding depth level that is different from the first coding depth level.

14. The non-transitory computer readable medium of claim 13, wherein a size of the encoded first region is less than a size of the encoded second region.

15. The non-transitory computer readable medium of claim 11, wherein the at least one visual element oriented in the oblique direction is located within a region of the frame, and wherein the instructions that cause encoding the at least one frame based on the coding depth level cause a reduced size of encoded data associated with the region of the frame.

16. The non-transitory computer readable medium of claim 11, wherein the at least one visual element oriented in the oblique direction is located within a first region, of a plurality of regions, of the frame, and wherein the coding depth level is associated with a first quantity of partitions that is different from a second quantity of partitions associated with a second region, of the plurality of regions, of the frame.

17. The non-transitory computer readable medium of claim 11, wherein the coding depth level based on the at least one visual element oriented in the oblique direction is less than a coding depth level associated with a visual element oriented in a non-oblique direction.

18. The non-transitory computer readable medium of claim 11, wherein the coding depth level based on the at least one visual element oriented in the oblique direction facilitates encoding at least a region of the at least one frame using less computational resources than another region of the at least one frame.

19. The non-transitory computer readable medium of claim 11, wherein the instructions that cause determining the at least one visual element oriented in the oblique direction within the at least one frame cause at least one of:
applying an oblique filter to the at least one frame;
determining an edge of the at least one visual element;
applying at least one of a high-pass filter, a band-pass filter, or a low-pass filter to the at least one frame;
determining that a rotational orientation of the at least one visual element is 25-65 degrees from at least one of a first axis of the at least one frame or a second axis of the at least one frame, wherein the second axis is orthogonal to the first axis; or
determining that a rotational orientation of the at least one visual element is 115-155 degrees from at least one of a first axis of the at least one frame or a second axis of the at least one frame, wherein the second axis is orthogonal to the first axis.

20. The non-transitory computer readable medium of claim 11, wherein the instructions, when executed, further cause sending the encoded frame for output via a computing device.

21. A device comprising:
one or more processors; and
memory storing instructions that, when executed by the one or more processors, cause the device to:
determine at least one visual element oriented in an oblique direction within at least one frame; and
encode the at least one frame based on a coding depth level, wherein the coding depth level is based on determining the at least one visual element oriented in the oblique direction.

22. The device of claim 21, wherein the at least one visual element oriented in the oblique direction is located within a region of the frame, and wherein the instructions that, when executed by the one or more processors, cause the device to encode the at least one frame based on the coding depth level, cause the device to encode the region of the at least one frame based on the coding depth level.

23. The device of claim 21, wherein the instructions that, when executed by the one or more processors, cause the device to encode the at least one frame based on the coding depth level, cause the device to:
encode a first region, of the at least one frame, associated with the at least one visual element oriented in the oblique direction based on a first coding depth level; and
encode a second region, of the at least one frame, associated with at least one visual element oriented in a non-oblique direction based on a second coding depth level that is different from the first coding depth level.

24. The device of claim 23, wherein a size of the encoded first region is less than a size of the encoded second region.

25. The device of claim 21, wherein the at least one visual element oriented in the oblique direction is located within a region of the frame, and wherein the instructions that, when executed by the one or more processors, cause the device to encode the at least one frame based on the coding depth level cause a reduced size of encoded data associated with the region of the frame.

26. The device of claim 21, wherein the at least one visual element oriented in the oblique direction is located within a first region, of a plurality of regions, of the frame, and wherein the coding depth level is associated with a first quantity of partitions that is different from a second quantity of partitions associated with a second region, of the plurality of regions, of the frame.

27. The device of claim 21, wherein the coding depth level based on the at least one visual element oriented in the oblique direction is less than a coding depth level associated with a visual element oriented in a non-oblique direction.

28. The device of claim 21, wherein the coding depth level based on the at least one visual element oriented in the oblique direction facilitates the device to encode at least a region of the at least one frame using less computational resources than another region of the at least one frame.

29. The device of claim 21, wherein the instructions that, when executed by the one or more processors, cause the device to determine the at least one visual element oriented in the oblique direction within the at least one frame cause the device to at least one of:
apply an oblique filter to the at least one frame;
determine an edge of the at least one visual element;
apply at least one of a high-pass filter, a band-pass filter, or a low-pass filter to the at least one frame;
determine that a rotational orientation of the at least one visual element is 25-65 degrees from at least one of a first axis of the at least one frame or a second axis of the at least one frame, wherein the second axis is orthogonal to the first axis; or
determine that a rotational orientation of the at least one visual element 115-155 degrees from at least one of a first axis of the at least one frame or a second axis of the at least one frame, wherein the second axis is orthogonal to the first axis.

30. The device of claim 21, wherein the instructions that, when executed by the one or more processors, further cause the device to send the encoded frame for output via a computing device.

31. A system comprising:
a first computing device configured to:
determine at least one visual element oriented in an oblique direction within at least one frame; and
encode the at least one frame based on a coding depth level, wherein the coding depth level is based on determining the at least one visual element oriented in the oblique direction; and
send the encoded at least one frame; and
a second computing device configured to receive the encoded at least one frame for output via the second computing device.

32. The system of claim 31, wherein the at least one visual element oriented in the oblique direction is located within a region of the frame, and wherein the first computing device is configured to encode the at least one frame based on the coding depth level by encoding the region of the at least one frame based on the coding depth level.

33. The system of claim 31, wherein the first computing device is configured to encode the at least one frame based on the coding depth level by:
encoding a first region, of the at least one frame, associated with the at least one visual element oriented in the oblique direction based on a first coding depth level; and
encoding a second region, of the at least one frame, associated with at least one visual element oriented in a non-oblique direction based on a second coding depth level that is different from the first coding depth level.

34. The system of claim 33, wherein a size of the encoded first region is less than a size of the encoded second region.

35. The system of claim 31, wherein the at least one visual element oriented in the oblique direction is located within a region of the frame, and wherein encoding, by the first computing device, the at least one frame based on the coding depth level results in a reduced size of encoded data associated with the region of the frame.

36. The system of claim 31, wherein the at least one visual element oriented in the oblique direction is located within a first region, of a plurality of regions, of the frame, and wherein the coding depth level is associated with a first quantity of partitions that is different from a second quantity of partitions associated with a second region, of the plurality of regions, of the frame.

37. The system of claim 31, wherein the coding depth level based on the at least one visual element oriented in the oblique direction is less than a coding depth level associated with a visual element oriented in a non-oblique direction.

38. The system of claim 31, wherein the coding depth level based on the at least one visual element oriented in the oblique direction facilitates the first computing device to encode at least a region of the at least one frame using less computational resources than another region of the at least one frame.

39. The system of claim 31, wherein the first computing device is configured to determine the at least one visual element oriented in the oblique direction within the at least one frame by at least one of:
 applying an oblique filter to the at least one frame;
 determining an edge of the at least one visual element;
 applying at least one of a high-pass filter, a band-pass filter, or a low-pass filter to the at least one frame;
 determining that a rotational orientation of the at least one visual element is 25-65 degrees from at least one of a first axis of the at least one frame or a second axis of the at least one frame, wherein the second axis is orthogonal to the first axis; or
 determining that a rotational orientation of the at least one visual element is 115-155 degrees from at least one of a first axis of the at least one frame or a second axis of the at least one frame, wherein the second axis is orthogonal to the first axis.

\* \* \* \* \*